(12) United States Patent
Hayashi et al.

(10) Patent No.: US 10,061,624 B2
(45) Date of Patent: Aug. 28, 2018

(54) PARALLEL COMPUTING SYSTEM, JOB MANAGEMENT DEVICE, AND JOB MANAGEMENT METHOD

(71) Applicant: FUJITSU LIMITED, Kawasaki-shi, Kanagawa (JP)

(72) Inventors: Naoki Hayashi, Yokohama (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 166 days.

(21) Appl. No.: 14/996,514

(22) Filed: Jan. 15, 2016

(65) Prior Publication Data
US 2016/0259672 A1  Sep. 8, 2016

(30) Foreign Application Priority Data

Mar. 2, 2015 (JP) ................................ 2015-040009

(51) Int. Cl.
G06F 9/50 (2006.01)
G06F 9/52 (2006.01)
H04L 29/08 (2006.01)

(52) U.S. Cl.
CPC .............. *G06F 9/5088* (2013.01); *G06F 9/52* (2013.01); *H04L 67/1021* (2013.01);
(Continued)

(58) Field of Classification Search
None
See application file for complete search history.

(56) References Cited

U.S. PATENT DOCUMENTS

| 2002/0002578 A1* | 1/2002 | Yamashita | G06F 9/4862 718/105 |
|---|---|---|---|
| 2014/0068623 A1 | 3/2014 | Kanemasa et al. | |
| 2015/0319230 A1* | 11/2015 | Skjolsvold | H04L 67/101 709/224 |

FOREIGN PATENT DOCUMENTS

| JP | 7-219787 | 8/1995 |
| JP | 2002-7364 | 1/2002 |
| JP | 2014-49112 | 3/2014 |

OTHER PUBLICATIONS

Yoo et al., On Task Relocation in Two-Dimensional Meshes, Journal of Parallel and Distributed Computing 60, 616-638 (2000).*
(Continued)

*Primary Examiner* — Lewis A Bullock, Jr.
*Assistant Examiner* — Kevin X Lu
(74) *Attorney, Agent, or Firm* — Staas & Halsey LLP

(57) ABSTRACT

A parallel-computing system includes: computation nodes connected in a mesh or torus connection and configured to perform parallel-computation; and a job management node including a computer, being coupled to the computation nodes, and being configured to: manage a plurality of jobs, select a first job from the jobs being executed by any of the computation nodes, search for a second area adjoining a first area occupied by a first computation node of the computation nodes executing the first job, the second area being occupied by a free computation node not executing any job, determine a fourth area of a same size as the first area at a location contacting an end in a predetermined direction in a third area comprising the first area and the second area, determine a fifth area of a predetermined shape in a range not overlapping the fourth area in the third area.

8 Claims, 22 Drawing Sheets

(52) U.S. Cl.
CPC .... *G06F 2209/502* (2013.01); *H04L 67/1008* (2013.01); *H04L 67/28* (2013.01)

(56) References Cited

OTHER PUBLICATIONS

Fasano, MIP-based Heuristic for no-standard 3D-packing Problems, 4)R(2008) 6:291-310.*

G Fasano, "A global optimization point of view to handle non-standard object packing problems", J Glob Optim 2013.* van der Veen et al, "Defragmenting the Module Layout of a Partially Reconfigurable Device", arXiv:cs/0505005, May 2, 2005 (Year: 2005).*

* cited by examiner

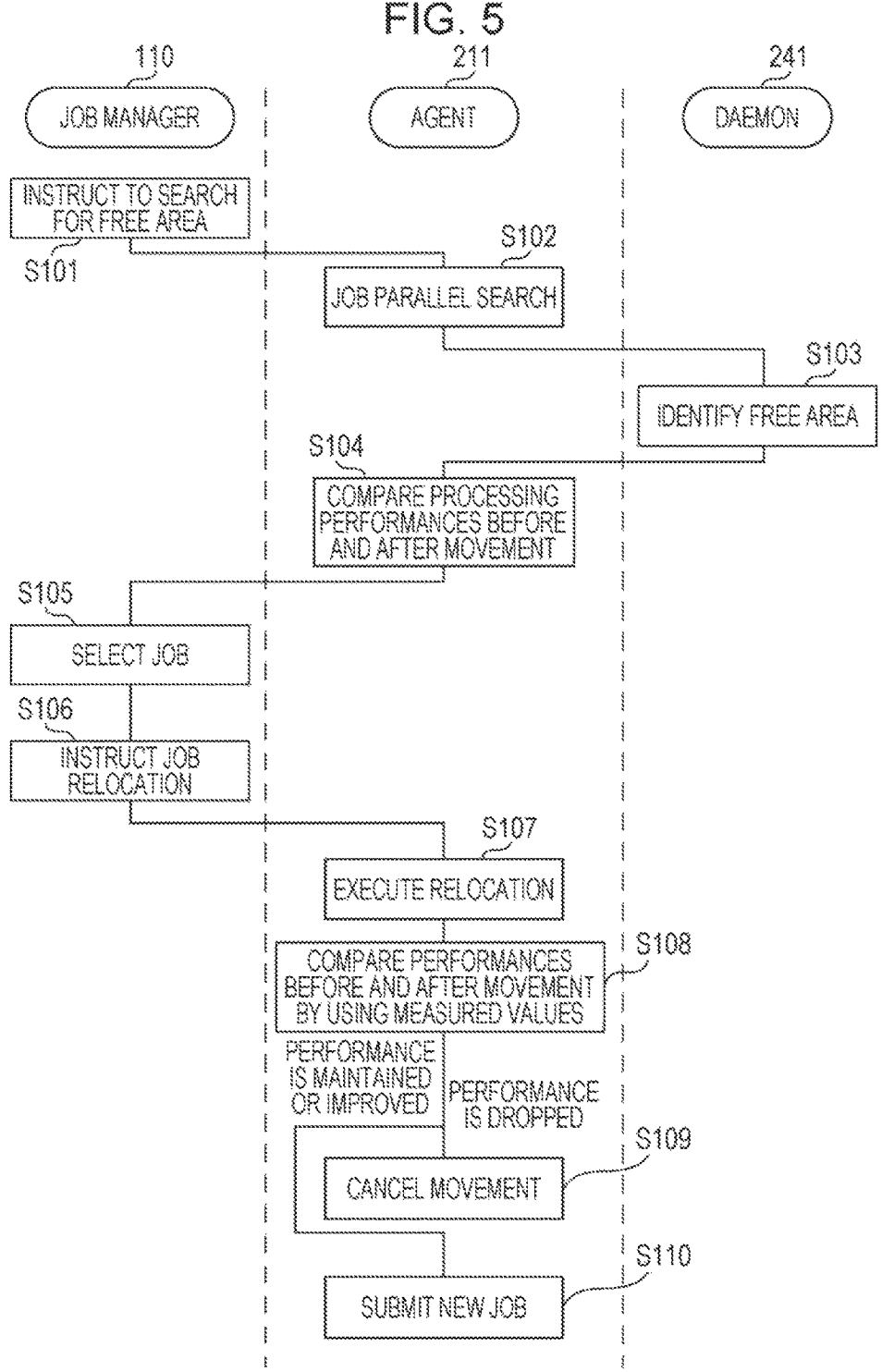

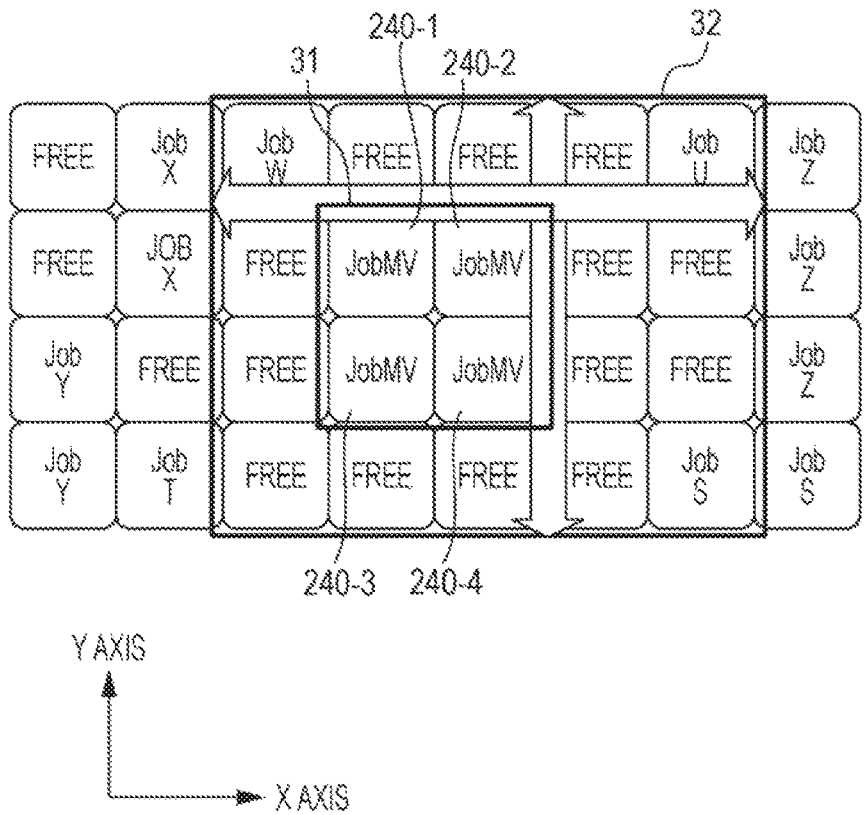

```
struct _TRANSFER DATA
unsigned int Xaddress ; // ENTRY OF X AXIS
unsigned int Yaddress ; // ENTRY OF Y AXIS
unsigned int Zaddress ; // ENTRY OF Z AXIS
unsigned int source_Xaddress ; // X AXIS VALUE OF TRANSMISSION SOURCE
unsigned int source_Yaddress ; // Y AXIS VALUE OF TRANSMISSION SOURCE
unsigned int source_Zaddress ; // Z AXIS VALUE OF TRANSMISSION SOURCE
unsigned int HopCounter ; HOP NUMBER COUNTER

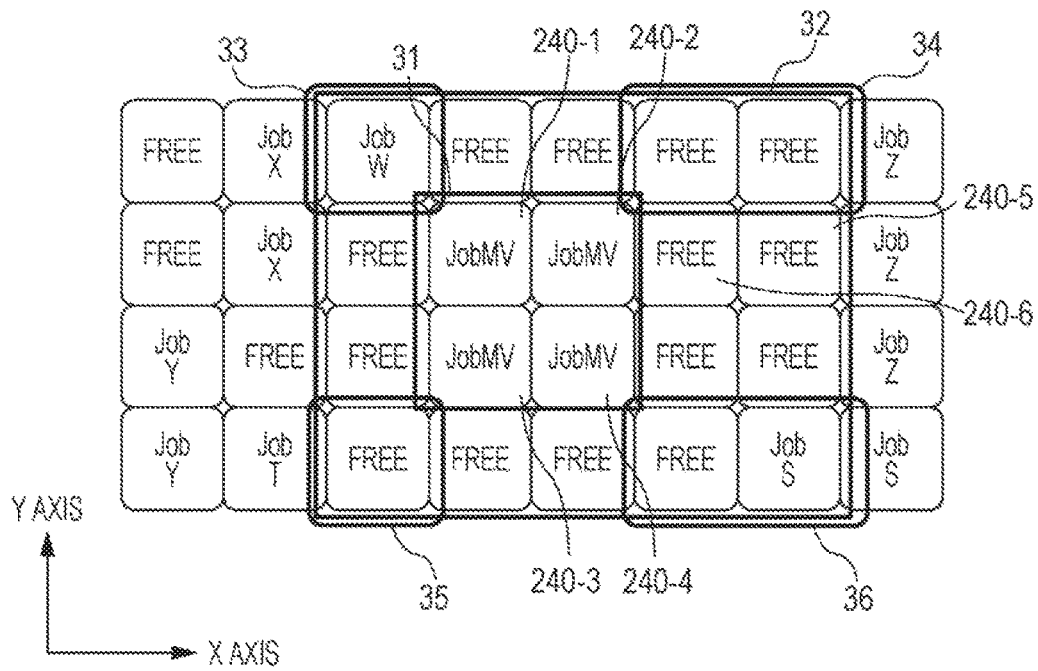

FIG. 9

```
struct _TRANSFER DATA
unsigned int Xaddress ; // ENTRY OF X AXIS
unsigned int Yaddress ; // ENTRY OF Y AXIS
unsigned int Zaddress ; // ENTRY OF Z AXIS
unsigned int source_Xaddress ; // X AXIS VALUE OF TRANSMISSION SOURCE
unsigned int source_Yaddress ; // Y AXIS VALUE OF TRANSMISSION SOURCE
unsigned int source_Zaddress ; // Z AXIS VALUE OF TRANSMISSION SOURCE
unsigned int HopCounter ; HOP NUMBER COUNTER unsigned int relay_Xaddress ; // X AXIS VALUE OF RELAY NODE
unsigned int relay_Yaddress ; // Y AXIS VALUE OF RELAY NODE
unsigned int relay_Zaddress ; // Z AXIS VALUE OF RELAY NODE

};
```

FIG. 13
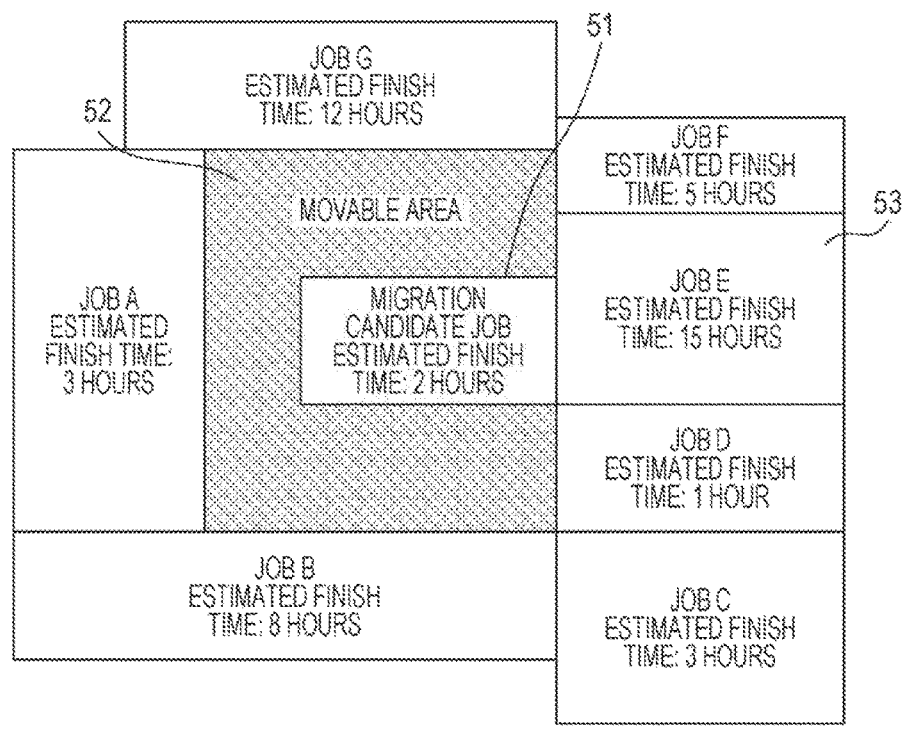
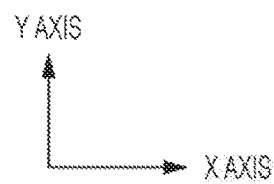

FIG. 16

```
typedef struct{
char jobID;
char *jobname;
uint x;
uint x_length;
uint y;
uint y_length;
uint z;
uint z_length;
char *next_job_info;
}JOB_INFO jobinfo;
```
54

FIG. 17

| PATTERN TYPE | NEW JOB ESTIMATED FINISH TIME | MIGRATION CANDIDATE JOB ESTIMATED FINISH TIME | SELECTION ACTION |
|---|---|---|---|
| PATTERN 1 | LONG | SHORT | SELECTION ACTION I |
| PATTERN 2 | SHORT | LONG | SELECTION ACTION II |
| PATTERN 3 | SAME | SAME | SELECTION ACTION I |

PARALLEL COMPUTING SYSTEM, JOB MANAGEMENT DEVICE, AND JOB MANAGEMENT METHOD

CROSS-REFERENCE TO RELATED APPLICATION

This application is based upon and claims the benefit of priority of the prior Japanese Patent Application No. 2015-040009, filed on Mar. 2, 2015, the entire contents of which are incorporated herein by reference.

FIELD

The embodiments discussed herein are related to a parallel computing system, a job management device, and a job management method.

BACKGROUND

In a large-scale computer system, it is important to operate the entire system efficiently. In general, a job scheduler allocates a node to the job for executing the job in consideration of time and spatial factors. The job is executed by the allocated node. The job scheduler is software configured to manage the job to be executed by the computer system. For example, the job scheduler also controls start and end of a plurality of jobs (program and batch processing), as well as monitors and reports job's execution and end state, in addition to the allocation of the node to the job.

When allocating a plurality of nodes to the job, adjoining nodes are allocated as much as possible for efficient communication between nodes executing the job. For example, if the system has a network topology of a mesh or torus connection, a sub-mesh (a rectangular area in the case of a two dimensional structure, or a cuboid area in the case of a three dimensional structure) is established within the network. Then, a free node in the sub-mesh is allocated to one job. The free node is a node not executing the job.

However, even if the network as a whole has free nodes corresponding to the number of nodes used for execution of the job, there may be a case where it is difficult to secure a sub-mesh including nodes corresponding to the number of nodes. One of the factors therefor may be that free nodes are in a fragmentation state. The fragmentation state is a state where a node in use and a free node are located in a worm-eaten state. For example, the system becomes in the fragmentation state due to an erroneous estimate of the job execution completion time during the transition of time. The fragmentation state lowers operation efficiency of the system and thereby deteriorates the throughput.

As a technique for improving the use efficiency of the job, for example, there is a technique which predicts a system operating state after elapse of a predetermined time based on measurement data and analysis data and establishes an optimum job execution environment based on the prediction result. Also, there is a technique which reduces a scheduling error caused by job execution and thereby improves the utilization efficiency of the computer resources in the parallel computing system. Further, a technique for suppressing violent fluctuation of the response time has also been studied.

Related techniques are disclosed in, for example, Japanese Laid-open Patent Publication Nos. 7-219787, 2002-007364, and 2014-049112.

When a well-arranged free node group is not found due to the fragmentation of free nodes, the well-arranged free node group may be generated, for example, by the job migration. The job migration is a technique which moves a job being executed by a node to another node. To generate a well-arranged free node group by the job migration, free nodes which may resolve the fragmentation are searched for as the migration destination of the job.

In the case of a large-scale system, however, if the migration destination of the job is searched for throughout the system, an extensive range is searched. For example, when searching for locations for relevant jobs simply based on an optimum solution as a whole, there are a huge number of combinations which take enormous time for computation. Thus, there is a problem in that it is difficult to perform the processing in real time.

According to an aspect of the present disclosure, an object of the embodiments is to quickly provide a well-arranged free node group.

SUMMARY

According to an aspect of the embodiments, a parallel computing system includes: a plurality of computation nodes connected in a mesh or torus connection and configured to perform parallel computation; and a job management node including a computer, being coupled to the plurality of computation nodes, and being configured to: manage a plurality of jobs, select a first job from the plurality of jobs being executed by any of the plurality of computation nodes, search for a second area adjoining a first area occupied by a first computation node of the plurality of computation nodes executing the first job, the second area being occupied by a free computation node not executing any job, determine a fourth area of a same size as the first area at a location contacting an end in a predetermined direction in a third area comprising the first area and the second area, determine a fifth area of a predetermined shape in a range not overlapping the fourth area in the third area, determine whether a second job is executable by a third computation node included in the fifth area, and when determine that the second job is executable, instruct the first computation node to migrate the first job to a second computation node in the fourth area, and instruct the third computation node to execute the second job.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a job submission processing procedure involving job relocation;

FIG. 6 illustrates an example of a free area identification processing;

FIG. 7 illustrates an example of transfer data;

FIG. 8 illustrates an example of an unsearched area in a temporary search frame;

FIG. 9 illustrates an example of an unsearched area transfer data;

FIG. 13 illustrates an example of a job migration according to a third embodiment;

FIG. 16 illustrates an example of peripheral job information;

FIG. 17 illustrates patterns of a result of the comparison between estimated finish times of a new job and a migration candidate job;

DESCRIPTION OF EMBODIMENTS

Hereinafter, present embodiments are described with reference to the accompanying drawings. Respective embodiments may be implemented in combination with a plurality of embodiments within a consistent scope.

Figure 1:
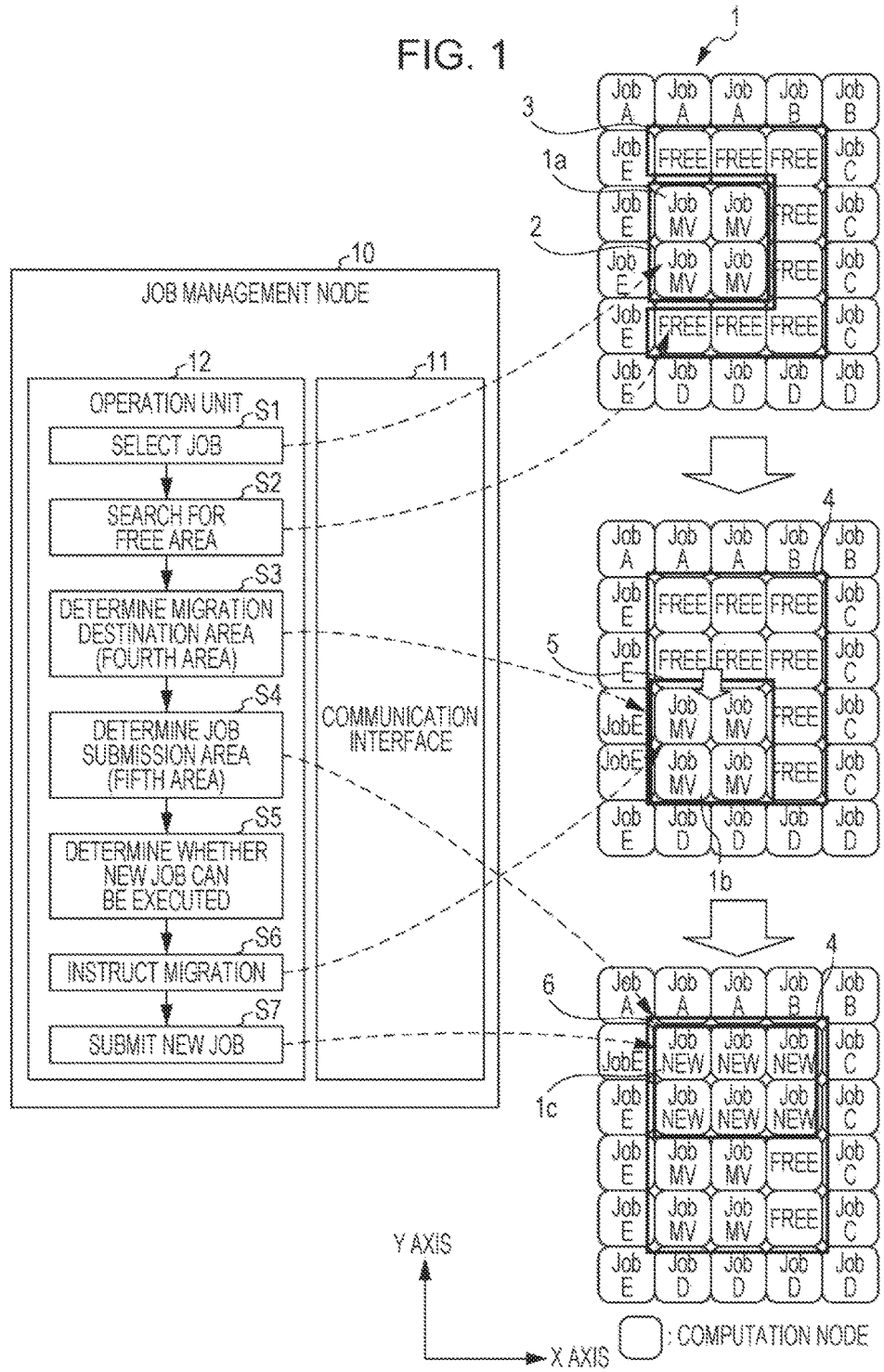
FIG. 1 illustrates an example of a parallel computing system according to a first embodiment.

FIG. 1 illustrates an example of a parallel computing system according to the first embodiment. The parallel computing system according to the first embodiment includes a plurality of computation nodes 1 and a job management node 10.

The plurality of computation nodes 1 are, for example, computers constituting a mesh or torus connection network. The plurality of computation nodes 1 are connected to each other via, for example, a high-speed interconnect. Each computation node of the plurality of computation nodes 1 executes a job. The job includes a parallel job executed by the plurality of computation nodes in cooperation with each other. When a parallel job is executed, a plurality of computation nodes for execution of the job is allocated to the job. The plurality of computation nodes executing the parallel job transmit and receive data therebetween during the job execution process. When communication between computation nodes executing a parallel job is relayed via a computation node executing the other job, processing speed of the parallel job may drop due to effects of the other job. In order to suppress occurrence of such a case, a plurality of computation nodes allocated to one parallel job are selected from one well-arranged area of a predetermined shape. For example, in a network topology of an n dimensional (n is an integer of 2 or larger) mesh or torus connection, a sub-mesh in which the area is identified is generated by designating an n dimensional range in axial directions, and computation nodes in the same sub-mesh are allocated to the parallel job. In a network of two dimensional connection, the sub-mesh is rectangular, and in a network of three dimensional connection, the sub-mesh is cuboid.

A job management node 10 is a device (job management device) configured to manage the job, and is a computer, for example. The job management node 10 comprises a communication interface 11 and an operation unit 12. The operation unit 12 may comprise, for example, a processor and a memory coupled to the processor. The communication interface 11 communicates with a plurality of computation nodes 1. The operation unit is configured to manage a job to be executed by the plurality of computation nodes 1, via the communication interface 11.

For example, the operation unit 12 allocates the computation node to the job and instructs the allocated computation node to execute the job. Also, the operation unit 12 instructs the plurality of computation nodes 1 to migrate the job. For example, the operation unit 12 instructs the job migration in order to bring together free computation nodes not executing the job into one area. For example, a sub-mesh including a number of computation nodes enough to execute a newly submitted job may not be generated within a network. In this case, the operation unit 12 moves the job by the migration and generates an area for free computation nodes such that a sub-mesh of a sufficient size can be generated. Specific examples are described below.

First, the operation unit 12 selects a first job (JobMV) from a plurality of jobs being executed by any one of the plurality of computation nodes (Step 1). Next, the operation unit 12 searches a second area 3 which adjoins a first area 2 occupied by a first computation node is executing the first job and which is occupied by a free computation node not executing any job (Step S2). Here, an area comprising the first area 2 and the second area 3 is assumed to be a third area 4.

Next, the operation unit 12 determines a fourth area 5 of the same size as the first area 2 at a location in contact with an end of the third area 4 in a predetermined direction (Step S3). For example, the operation unit 12 regards an area obtained by parallel movement of the first area 2 as the fourth area 5. In this case, the first area 2 and the fourth area 5 have the same size and the same shape. That is, the both areas are congruent.

Next, the operation unit 12 determines a fifth area 6 of a predetermined shape in a range not overlapping the fourth area 5 in the third area 4 (Step S4). The fifth area 6 is a rectangular sub-mesh in the case of a two dimensional structure, or a cuboid sub-mesh in the case of a three dimensional structure. For example, the operation unit 12 regards a largest sub-mesh which can be generated in a range excluding the fourth area 5 in the third area 4, as the fifth area 6.

Next, the operation unit 12 determines whether a newly submitted second job (JobNEW) is executable by a third computation node is included in the fifth area 6 (Step S5). For example, the operation unit 12 determines that the second job is executable if the number of third computation nodes is included in the fifth area 6 is equal to or larger than the number of computation nodes used for execution of the second job.

If determined that the second job is executable, the operation unit 12 instructs the first computation node is to migrate the first job to a second computation node 1b in the fourth area 5 (Step S6). Also, the operation unit 12 instructs the third computation node is to execute the second job (Step S7).

If the second job is difficult to be executed by the third computation node is included in the fifth area 6, the other job being executed is selected as the first job, and the same processing is repeated. Thus, the fifth area 6 of a size sufficient for execution of the second job is generated, and the second job is executable. For example, in the example of FIG. 1, six computation nodes are used for execution of the second job. Before the first job is migrated, six or more free computation nodes exist, but are not brought together within a rectangular area. For this reason, the second job is not executable without moving the first job. In the example of FIG. 1, if the first job is migrated to a computation node within the fourth area provided at a corner in each of negative directions of X and Y axes, a rectangular fifth area 6 including six computation nodes can be generated. Then, the first job is moved to a computation node in the fourth area 5 by the migration, and the second job is executed in a computation node in the fifth area 6 resulting therefrom.

Thus, in the first embodiment, an area including free computation nodes enough to execute a newly submitted job can be generated just by moving one job to a peripheral free computation node. Since the number of jobs to be moved is limited to one, and the free computation node search range is limited to the peripheral of the computation node executing the job, processing can be performed at a very high speed. For example, in a large-scale system, it takes a very long time to generate a well-arranged free area by relocating the job to a plurality of computation nodes 1 as a whole. Meanwhile, if the search is limited to the peripheral of one job and only one job is moved, processing may be performed at a high speed.

Further, the operation unit 12 is also capable of searching the second area 3 by utilizing the first computation node 1a. For example, the operation unit 12 instructs the first computation node is to search the second area 3. The instructed first computation node is transmits first data for search for the free computation node to an adjoining node. Upon receiving the first data, the free computation node counts up the value of a first counter in the first data and transfers the first data to a computation node adjoining the side opposite to the first computation node. For example, when the free computation node acquires first data from an adjoining computation node in the negative direction of the X axis, first data with an updated value of the first counter is transferred to an adjoining computation node in the positive direction of the X axis. Among the plurality of computation nodes 1, a node in use executing any job sends the first data back to the first computation node upon receiving the same. The first computation node is identifies the range of the second area 3 based on the value of the first counter in the returned first data and transmits information indicating the identified range of the second area 3 to the job management node 10. For example, the value "2" of the returned first counter indicates that two free computation nodes exist in the direction from where the first data is transmitted.

Thus, the number of free computation nodes existing in a space, for example, in the X axis or Y axis direction of the first area 2. Assuming that the location of the first area 2 moved in parallel in the X axis direction or in the Y axis direction is the fourth area 5, search the second area 3 may be terminated at this stage if a newly submitted second job is executable. If the location of the first area 2 moved in parallel in the X direction and Y direction is considered as the fourth area 5, the following search may be performed.

When the first data is returned, the first computation node is transmits second data for search for a free node in a different direction to a relaying free computation node on a transfer path of the first data. Upon receiving the second data, the relaying free computation node transfers the second data to an adjoining computation node in a direction other than a direction toward the first computation node is and a direction opposite thereto. For example, when the relaying free computation node acquires second data from an adjoining computation node in the negative direction of the X axis, the second data is transferred to adjoining computation nodes in both positive and negative directions of the Y axis. Upon receiving the second data, the free computation node counts up the value of the second counter in the second data and transfers the second data to an adjoining computation node on the side opposite to the direction toward the relaying free computation node. For example, when the free computation node acquires second data from an adjoining computation node in the negative direction of the Y axis, second data with an updated value of the second counter is transferred to an adjoining computation node in the positive direction of the Y axis. Upon receiving the second data, a node in use returns the second data to the first computation node 1a. The first computation node is identifies the range of the second area 3 based on the value of the first counter and second counter in the returned first data and second data and transmits the identified range of the second area 3 to the job management node 10. For example, the value "2" of the returned first counter indicates that two free computation nodes exist in the direction (for example, X axis direction) from where the first data is transmitted. Then, the value "2" of the second counter relayed via a free computation node indicates that two free computation nodes exist in the direction (for example, Y axis direction) where the second data is transmitted from the free node.

Thus, the second area 3 can be searched by transmitting the first data and second data to the first computation node 1a. This enables search processing to be performed by the plurality of computation nodes in a distributed manner and thereby improves the processing efficiency.

Further, the operation unit 12 may determine the fourth area 5 based on the estimated finish time indicating a time taken to finish a processing for each of peripheral jobs being executed in computation nodes adjoining the third area 4. For example, the fourth area 5 is determined at a location adjoining a computation node executing a peripheral job having a longest estimated finish time. Thus, for example, a free node may be provided around a computation node executing a job having a short estimated finish time such that after execution of the job ends, an area where free nodes are brought together in a wide range may be generated. As a result, a job executed with free nodes in a wide range may be submitted subsequently.

Further, when determining the fourth area 5 and the fifth area 6, the operation unit 12 may compare the estimated finish time of the first job and the estimated finish time of the second job, and then determine the fourth area 5 and the fifth area 6 based on the comparison result and the estimated finish time of each of peripheral jobs. For example, if the estimated finish time of the first job is longer than the estimated finish time of the second job, the fourth area 5 including a computation node executing the first job is determined at a location adjoining a computation node executing a job having a longest estimated finish time among peripheral jobs. If the estimated finish time of the second job is longer than the estimated finish time of the first job, the fifth area 6 including a computation node executing the second job is determined at a location adjoining a computation node executing a job having a longest estimated finish time among peripheral jobs. Thus, for example, a free node may be provided around a computation node executing a job having a short estimated finish time such that after execution of the job ends, an area where free nodes get together in a wide range may be generated.

Further, when instructing the migration, the operation unit 12 may compare performance of the first computation node 1s and performance of the second computation node 1b, and instruct the migration only when performance of the second computation node 1b is equal to or higher than a value obtained by multiplying performance of the first computation node 1s by a predetermined value. For example, assuming that the predetermined value is "1", the migration is performed only when performance of the second computation node 1b is equal to or higher than performance of the first computation node 1a. Thus, drop of the throughput of the first job resulting from moving the first job may be suppressed.

The operation unit 12 may be implemented, for example, by a processor of the job management node 10. Lines for coupling elements shown in FIG. 1 indicate a portion of communication paths, and a communication path other than the illustrated communication paths may be established.

Next, a second embodiment is described. The second embodiment is a parallel computing system using a computation node group connected in a mesh or torus manner.

Figure 2:
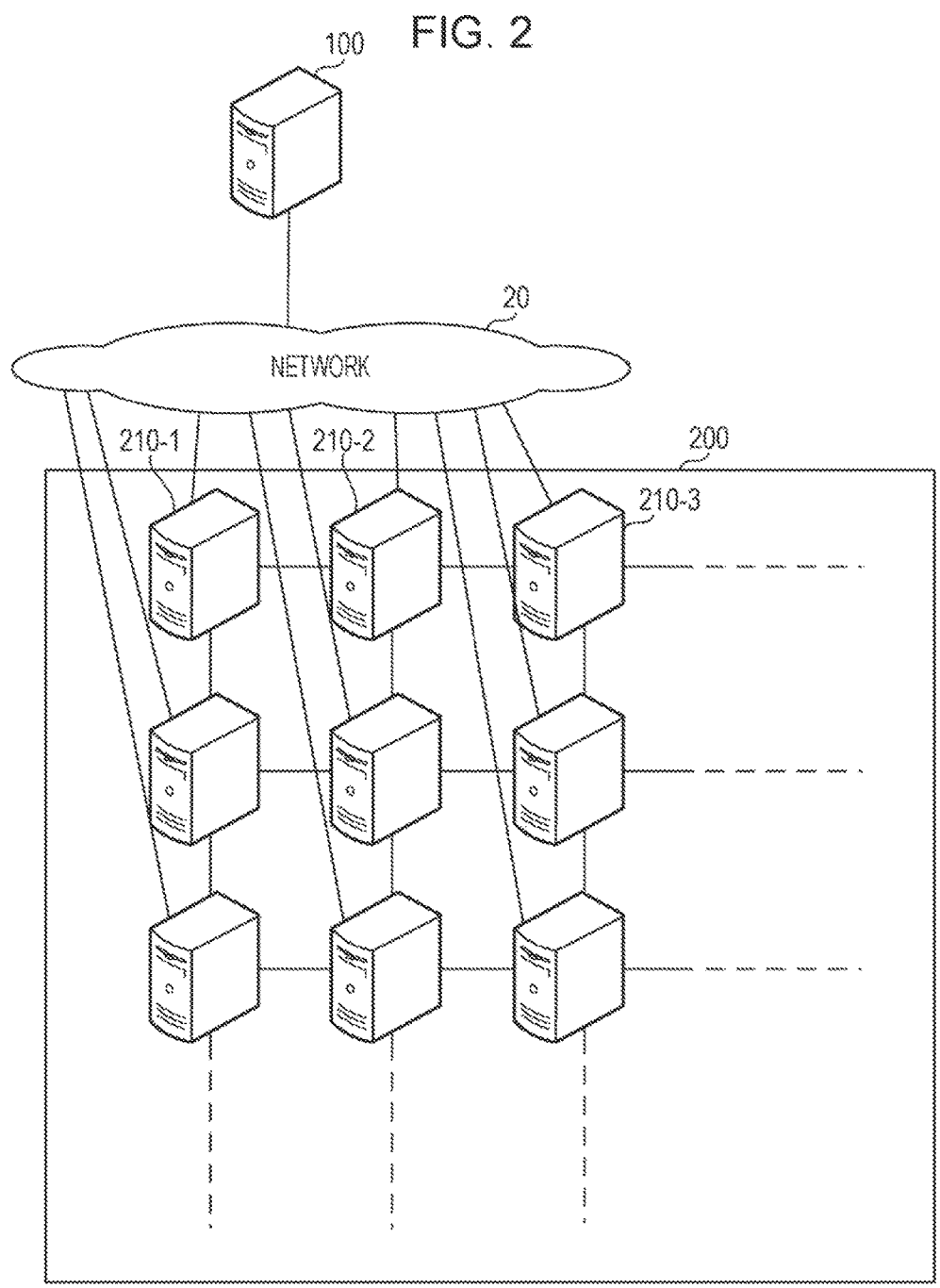
FIG. 2 illustrates a configuration example of the parallel computing system.

FIG. 2 illustrates a configuration example of the parallel computing system. The control node 100 is connected to computation nodes 210-1, 210-2, 210-3, . . . in a computation node group 200 via a network 20. The control node 100 is a computer configured to control a high performance computing (HPC) system comprising the computation node group 200. The computation nodes 210-1, 210-2, 210-3, . . . included in the computation node group 200 are computers configured to execute a job in accordance with the instruction given from the control node 100. The computation nodes 210-1, 210-2, 210-3, . . . include a simple computation node configured to execute computation only and an IO node configured to perform input/output (IO) processing and computation processing. In general, the number of IO nodes in the entire system is preferably smaller than the number of simple computation node.

The control node 100 allocates one or more computation nodes in the computation node group 200 to a job and transmits the instruction to execute the job to the allocated computation nodes. The control node 100 may change the computation node allocated to the job while the job is being executed. In that case, the control node 100 moves the task for executing the job by the migration. When the job migration is performed, data of the job is transferred from a computation node of the migration source to a computation node of the migration destination.

Computation nodes 210-1, 210-2, 210-3, . . . in the computation node group 200 are connected with each other, for example, via a network of mesh or torus connection. In the mesh connection, computation nodes 210-1, 210-2, 210-3, . . . are arranged in each axial direction of n dimension (n is an integer of 2 or larger). Computation nodes 210-1, 210-2, 210-3, . . . are connected to adjoining other computation nodes in each axial direction via a high-speed interconnect. In the torus connection, computation nodes at both ends in each axial direction are also connected via the interconnection.

Figure 3:
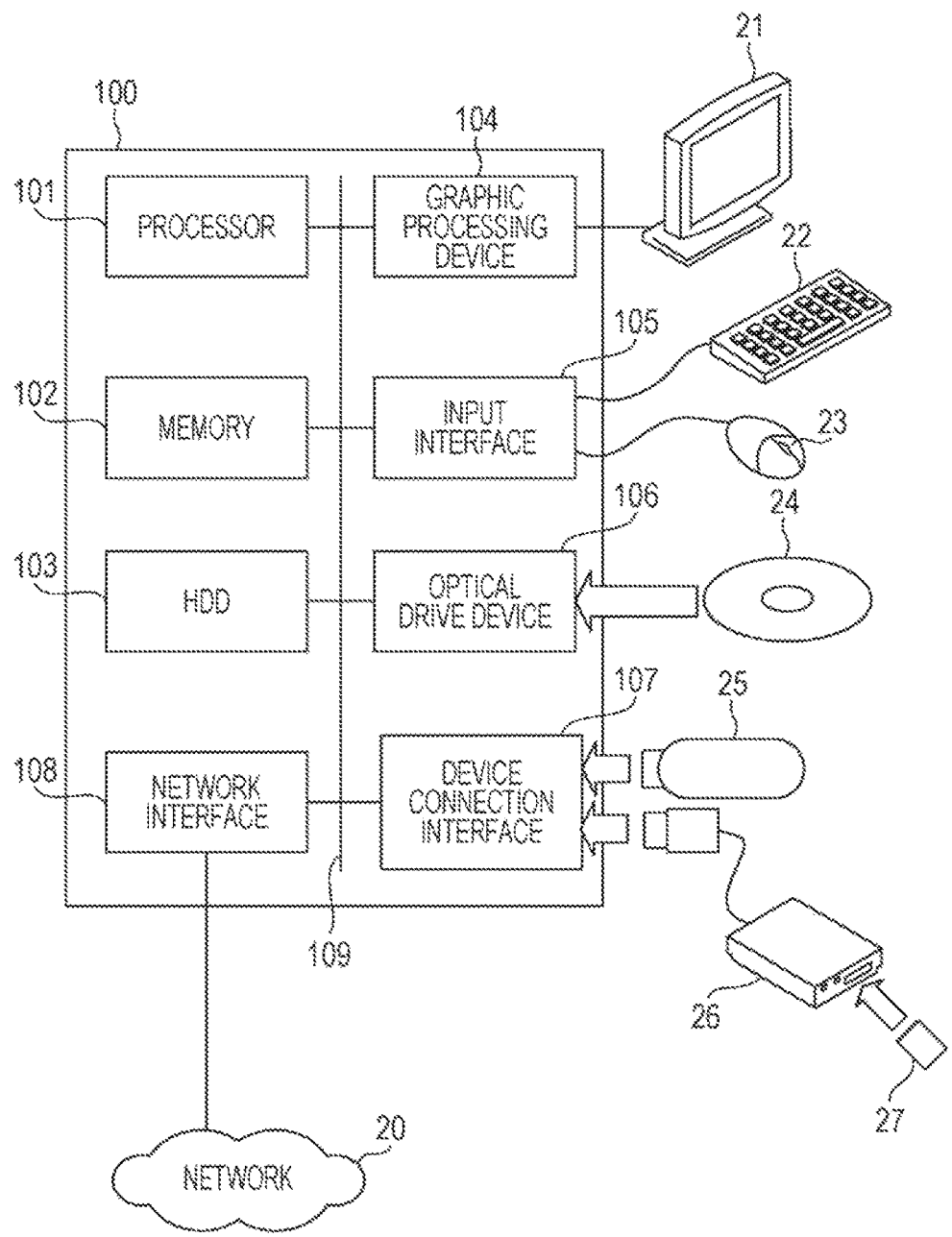
FIG. 3 illustrates a configuration example of hardware of a control node used in the present embodiment.

FIG. 3 illustrates an example of a hardware configuration example of a control node used in this embodiment. The control node 100 as a whole is controlled by a processor 101. The processor 101 is coupled with a memory 102 and a plurality of peripheral devices via a bus 109. The processor 101 may be a multiprocessor. The processor 101 is, for example, a central processing unit (CPU), a micro processing unit (MPU), or a digital signal processor (DSP). At least a portion of the function implemented when the processor 101 executes a program may be implemented by an electronic circuit such as application specific integrated circuit (ASIC) and programmable logic device (PLD).

The memory 102 is used as a main storage device of the control node 100. The memory 102 temporarily stores at least a portion of programs of operating system (OS) executed by the processor 101 and application programs. Further, the memory 102 stores various data used for processing by the processor 101. As the memory 102, a volatile semiconductor storage device such as, for example, a random access memory (RAM) is used.

Peripheral devices coupled to the bus 109 include a hard disk drive (HDD) 103, a graphic processing device 104, an input interface 105, an optical drive device 106, a device connection interface 107, and a network interface 108.

The HDD 103 magnetically writes and reads data from an incorporated disk. The HDD 103 is used as an auxiliary storage device of the control node 100. The HDD 103 stores OS programs, application programs, and various data. The auxiliary storage device may include a nonvolatile semiconductor storage device (SSD: solid state drive) such as a flash memory.

The graphic processing device 104 is coupled to a monitor 21. The graphic processing device 104 displays an image on a screen of the monitor 21 in accordance with an instruction given from the processor 101. The monitor 21 includes a display device and a liquid display device using a cathode ray tube (CRT).

The input interface 105 is connected to a keyboard 22 and a mouse 23. The input interface 105 transmits a signal sent from the keyboard 22 and the mouse 23 to the processor 101. The mouse 23 is an example of the pointing device. Thus, an alternative pointing device may be used. Other pointing devices include a touch panel, a tablet, a touch pad, a truck ball, and so on.

The optical drive device 106 reads data recorded in an optical disk 24 by utilizing laser beam. The optical disk 24 is a portable recording medium in which data is recorded in such a manner that it can be read by light reflection. The optical disk 24 includes a digital versatile disc (DVD), a DVD-RAM, a compact disc read only memory (CD-ROM), and CD-R (Recordable)/RW (Rewritable).

The device connection interface 107 is a communication interface for coupling peripheral devices to the control node 100. For example, the device connection interface 107 may be coupled to a memory device 25 and a memory reader writer 26. The memory device 25 is a recording medium having a function to communicate with the device connection interface 107. The memory reader writer 26 is a device configured to write data into a memory card 27 or read data from the memory card 27. The memory card 27 is a card type recording medium.

The network interface 108 is connected to the network 20. The network interface 108 transmits and receives data from other computers or communication devices via the network 20.

With such a configuration, processing functions of the second embodiment may be implemented. The job management node 10 and the plurality of computation nodes 1 according to the first embodiment also may be implemented by hardware similar with the control node 100 illustrated in FIG. 3.

The control node 100 implements processing functions of the second embodiment by executing, for example, a program recorded in a computer readable recording medium. A program describing details of processing to be executed by the control node 100 may be recorded in various recording media. For example, a program to be executed by the control node 100 may be stored in the HDD 103. The processor 101 implements the program by loading at least a portion of the program in the HDD 103 into the memory 102. The program to be executed by the control node 100 may be recorded in a portable recording medium such as the optical disk 24, the memory device 25, and the memory card 27. A program stored in a portable recording medium becomes ready to run, for example, after being installed on the HDD 103, for example, by control through the processor 101. Alternatively, the processor 101 may run the program by directly reading from a portable recording medium.

Figure 4:
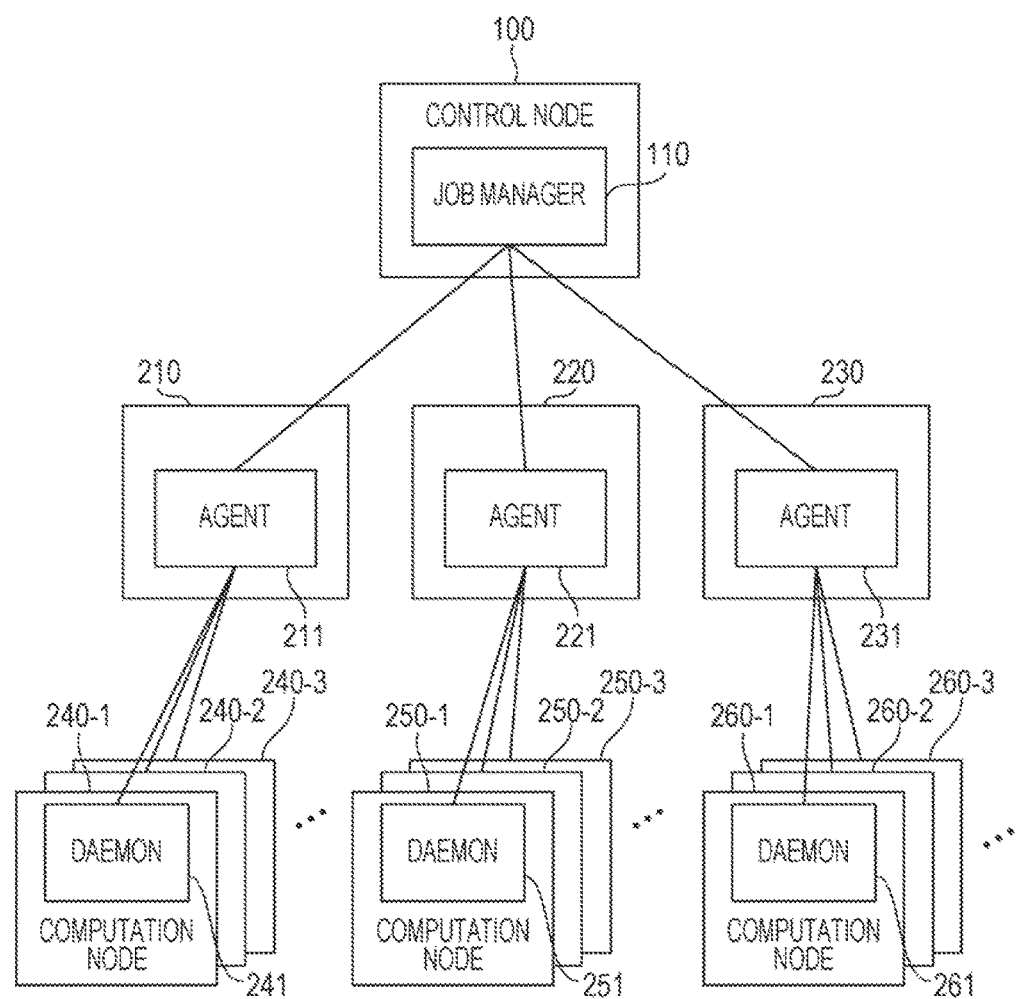
FIG. 4 is a block diagram illustrating the function of respective nodes.

FIG. 4 is a block diagram illustrating a function of respective nodes. The control node 100 comprises a job manager 110. The job manager 110 is configured to manage a job to be executed by a computation node. For example, the job manager 110 functions as a job scheduler, generates a job execution schedule, and causes the computation node to execute a job in accordance with the schedule. Computation nodes 210, 220, 230 comprise agents 211, 221, 231 respectively. The agents 211, 221, 231 manage execution of the job in a computation node within a responsible range in cooperation with the job manager 110. For example, the agent 211 manages execution of jobs in computation nodes 210, 240-1, 240-2, 240-3, . . . . The agent 221 manages execution of jobs in computation nodes 220, 250-1, 250-2, 250-3, . . . . The agent 231 manages execution of jobs in computation nodes 230, 260-1, 260-2, 260-3, . . . .

Computation nodes other than agents 211, 221, 231 comprising computation nodes 210, 220, 230 comprise daemons 241, 251, 261. The daemons 241, 251, 261 search for the free computation node therearound in accordance with an instruction from agents 211, 221, 231.

When allocating the computation node to the parallel job, the job manager 110 allocates a plurality of computation nodes at a well-arranged location on the network. For example, the job manager 110 establishes a sub-mesh including free computation nodes only on a mesh or torus indicating the connection relationship among computation nodes. Then, the job manager 110 allocates a plurality of computation nodes within the sub-mesh to the job. At that time, even if a sufficient number of free computation nodes exist within the network, a sub-mesh including the number of computation nodes corresponding to the job parallelism may not be established due to discrete location of free computation nodes by fragmentation. In this case, for example, the job manager 110 creates a free area of a predetermined size on a mesh or torus connection network by moving a portion of a plurality of jobs being executed (for example, one job only). Then, the job manager 110 allocates a computation node within the created free area to the job and causes the computation node to execute the job.

In the second embodiment, relocation of the job by the job migration and submission of a new job is implemented by relocating a portion of all jobs to enable quick processing. That is, optimization of job location is performed locally since real time performance is regarded as important. Furthermore, job relocation is limited to parallel movement to improve the efficiency of relocation processing. Further, to suppress drop of the job throughput by job relocation, when the throughput has dropped due to relocation, the relocated job is returned to the original location. Thus, drop of the operation efficiency by fragmentation is suppressed, and thereby throughput is improved (efficient operation).

In the job relocation, for example, one job desired to newly submit (submission candidate job) and a focused job currently executed (migration candidate job) are determined first. Next, by parallel movement of the migration candidate job, determination is made as to whether a free node group of a predetermined shape capable of executing the submission candidate job can be secured around the migration candidate jobs. Size of the submission candidate job (number of allocated computation nodes) and size and number of migration candidate jobs may be limited with appropriate threshold values. Next, a nearby free computation node group is searched for by replacing the migration candidate jobs with the submission candidate job. Individual searches may be performed, for example, by parallel distribution processing with each daemon of free node groups near the migration candidate job. This reduces time taken for the searching. When there are a plurality of submission candidate jobs, an appropriate number of computation node groups may be allocated to each of submission candidate jobs by repeating the processing for one new submission candidate job.

Above processings are implemented by cooperative processing among the job manager 110, the agents 211, 221, 231, and the daemons 241, 251, 261 of respective computation nodes. Also, above processings may be collectively executed by the job manager 110 of the control node 100. Function of the job management node 10 illustrated in FIG. 1 may be implemented, for example, by cooperative operation between the job manager 110 and the agents 211, 221, 231.

Lines for coupling elements shown in FIG. 4 indicate a portion of communication paths, and a communication path other than the illustrated communication paths can be established. Functions of each of elements illustrated in FIG. 4 may be implemented by causing a computer to run a program module corresponding thereto.

FIG. 5 illustrates an example of the job submission processing procedure involving job relocation. For example, when a subnet including free computation nodes sufficient for the parallelism of the executed job (number of computation nodes used for execution of the job) is not found, the job manager 110 starts job submission processing involving job relocation illustrated in FIG. 5.

The job manager 110 sends the free area search instruction to each of a plurality of agents (Step S101). FIG. 5 typically illustrates a cooperative processing with the agent 211.

Upon receiving the free area search instruction, the agent 211 performs job parallel search processing (Step S102). In the job parallel search processing, for example, the agent 211 transmits the free space identification instruction for the peripheral of the job to the daemon of the computation node executing the job among a plurality of computation nodes within the range under control thereof. FIG. 5 typically illustrates a cooperative processing with the daemon 241.

Upon receiving the free space identification instruction, the daemon 241 performs free area identification processing (Step S103). For example, the daemon 241 identifies the movable area of a job (migration candidate job) being executed by a computation node in which the daemon 241 itself is implemented, based on free computation nodes located around the computation node. Then, the daemon 241 notifies the movable area to the agent 211.

FIG. 6 illustrates an example of the free area identification processing. FIG. 6 illustrates the computation node of the rectangular shape. Name of the job being executed is indicated in the rectangular shape of the computation node executing the job. "Empty" is indicated in the rectangular shape of the computation node not executing the job.

The agent 211, for example, instructs a node executing the job to identify the free area. In the example of FIG. 6, the free space identification instruction is sent to a computation node executing the job under the name of "JobMV". In this case, the job under the name of "JobMV" becomes a migration candidate job 31. A range extending from a computation node in which the migration candidate job 31 is being executed to free computation nodes in respective axial directions becomes the free area search range. In the example of FIG. 6, the search range in the X axis direction corresponds to one node in the negative direction of the X axis and two nodes in the positive direction. The search range in the Y axis direction corresponds to one node in the negative direction of the Y axis and one node in the positive direction.

The migration candidate job 31 may be randomly selected by the agent 211. The agent 211, which has acquired, from the job manager 110, information of the job priority and the number of nodes used for the job, may also select a job having a priority lower than a reference value and having used nodes the number of which is smaller than a reference value, as the migration candidate job. As the reference of the number of used nodes, for example, the average number of nodes used for jobs executed in the past is applied. In this case, the migration candidate job is selected from jobs executed by computation nodes the number of which is equal to or smaller than the average. Also, for example, when a job of high priority is executed preferentially, the job priority may be set to five stages (1 represents highest priority, and 5 represents lowest priority). In this case, as the reference of priority for selecting the migration candidate job, the lower priority "4" is used. That is, the migration target job is selected out of jobs having the priority of "4" or "5".

Hereinafter, the free area identification processing is described by using the two-dimensional space network illustrated in FIG. 6 as an example. Even in a n-dimensional (three- or more-dimensional) mesh or torus connection network, the free area may be identified with the same operation basically.

[Procedure 1] The daemon 241 searches for the free computation node in the X axis direction of the migration candidate job to be moved (relocated). This determines how far free computation nodes exist continuously in both positive and negative directions of the X axis. In the example of FIG. 6, the migration candidate job 31 under the name of "JobMV" uses four computation nodes 240-1 to 240-4.

[Procedure 1-1] A daemon in the computation node 240-1 sends transfer data to an adjoining node in the negative direction of the X axis from the computation node 240-1. A computation node, which has received the transmission data, further sends the transfer data to an adjoining computation node in the negative direction of the X axis if the own node is a free computation node. A computation node, which has received the transmission data, returns the transfer data carrying the address thereof to the transmission source if the own node is executing a job.

FIG. 7 illustrates an example of the transfer data. FIG. 7 illustrates an example of transfer data 41 when implemented in a three-dimensional mesh or torus connection network. The transfer data 41 includes the address of the computation node from which the data is received (coordinate value of X axis, Y axis, and Z axis), the address of the computation node 240-1 of transmission source (coordinate value of X axis, Y axis, and Z axis), the hop number counter, and so on.

[Procedure 1-2] In the computation node which has received the transfer data 41, a daemon in the computation node determines whether the computation node is executing a job. If executing a job, the daemon sets the address of the own computation node into the transfer data 41 and transmits the transfer data 41 to the computation node 240-1 which is the transmission source. If not executing a job, the daemon adds 1 to the hop number counter in the transfer data 41 and transmits the transfer data 41 to a next adjoining computation node in the negative direction of the X axis thereof.

Thus, the daemon of the computation node 240-1 of the transmission source can recognize, from the content of the returned transfer data 41, the number of hops corresponding to free computation nodes existing in the negative direction of the X axis. The computation node 240-2 performs the similar search in the positive direction of the X axis. Thus, the daemon of the computation node 240-2 of the transmission source can recognize, from the content of the returned transfer data 41, the number of hops corresponding to free computation nodes existing in the positive direction of the X axis.

[Procedure 2] Next, the daemon 241 searches for the free computation node in the Y axis direction of the migration candidate job to be moved (relocated). For example, the daemon in the computation node 240-1 sends the transfer data 41 to an adjoining node in the positive direction of the Y axis from the computation node 240-1. Processing in a computation node which has received the transfer data 41 in the Y axis direction is the same as the processing of the transfer data 41 in the X axis direction. Thus, the daemon of the computation node 240-1 of the transmission source can recognize, from the content of the returned transfer data 41, the number of hops corresponding to free computation nodes existing in the negative direction of the Y axis. The computation node 240-3 performs the similar search in the negative direction of the Y axis. Thus, the daemon of the computation node 240-3 of the transmission source can recognize, from the content of the returned transfer data 41, the number of hops corresponding to free computation nodes existing in the negative direction of the Y axis.

Search of the free computation node is also performed in the other axis (for example, Z axis) by using the transfer data 41. By performing this, a temporary search frame 32 (see FIG. 6) in which the free computation node is included can be recognized. However, since the temporary search frame 32 is searched in respective directions from the migration candidate job 31, there still remains a computation node in the temporary search frame 32, and it is unclear whether the remaining computation node is a free computation node.

FIG. 8 illustrates an example of the unsearched area in the temporary search frame. As illustrated in FIG. 8, when the free computation node is searched for in the X axis direction and Y axis direction from the computation nodes 240-1 to 240-4 executing the migration candidate job 31, unsearched areas 33 to 36 remain respectively at four corners of the temporary search frame 32. It is still not clear whether computation nodes existing in unsearched areas 33 to 36 are free computation nodes.

Then, processing of the procedure 3 is performed. [Procedure 3] computation nodes in the temporary search frame 32 search unsearched areas 33 to 36 in the temporary search frame in cooperation with each other. For example, unsearched areas 33 to 36 are searched in accordance with the following procedure.

[Procedure 3-1] The computation node executing the migration candidate job 31 transmits unsearched area transfer data to the daemon of the computation node 240-5 having a largest coordinate (largest number) on the X axis among free nodes located in a row in the X axis direction.

FIG. 9 illustrates an example of the unsearched area transfer data. The unsearched area transfer data 42 includes the address (coordinate values of X axis, Y axis and Z axis) of the free computation node transmitting the unsearched area transfer data 42 as well as information similar with the transfer data 41 illustrated in FIG. 7.

The unsearched area transfer data 42 illustrated in FIG. 9 is sent to the free computation node 240-5 in the positive direction of the X axis, for example, by the daemon of the computation node 240-1 executing the migration candidate job 31 in the temporary search frame 32. At that time, address of the computation node 240-1 is entered as the address of the transmission source. The transmitted unsearched area transfer data 42 is once received by the free computation node 240-6 and then transferred to the computation node 240-5.

[Procedure 3-2] Free computation nodes 240-5, 240-6, which have received the unsearched area transfer data 42, are assumed to be relay nodes. The daemon of the relay nodes enters the address thereof into the unsearched area transfer data 42 as the address (coordinate value of X axis, Y axis and Z axis) of the relay node.

[Procedure 3-3] The daemon of each of relay nodes (computation nodes 240-5, 240-6) transfers the unsearched area transfer data 42 to each of adjoining computation nodes in positive and negative directions of the Y axis. The daemon of the computation node which has received the unsearched area transfer data 42 determines whether the computation node thereof is executing a job. If the computation node is executing a job, the daemon enters the address (coordinate value of X axis, Y axis and Z axis) into the unsearched area transfer data 42 and returns the unsearched area transfer data 42 to the transmission source. If the computation node is not executing a job, the daemon adds 1 to the hop value in the unsearched area transfer data 42 and transfers the unsearched area transfer data 42 to an area next in the Y axis direction thereof (in a direction away from the relay node).

This processing is also performed in the negative direction on the X axis of the migration candidate job 31. Thus, the computation node 240-1 of the transmission source of the unsearched area transfer data 42 recognizes whether a computation node in unsearched areas 33 to 36 is a free computation node. Information as to whether or not each computation node within the temporary search frame 32 is a free computation node is notified, for example, from the daemon 241 in the computation node 240-1 to the agent 211.

Figure 10:
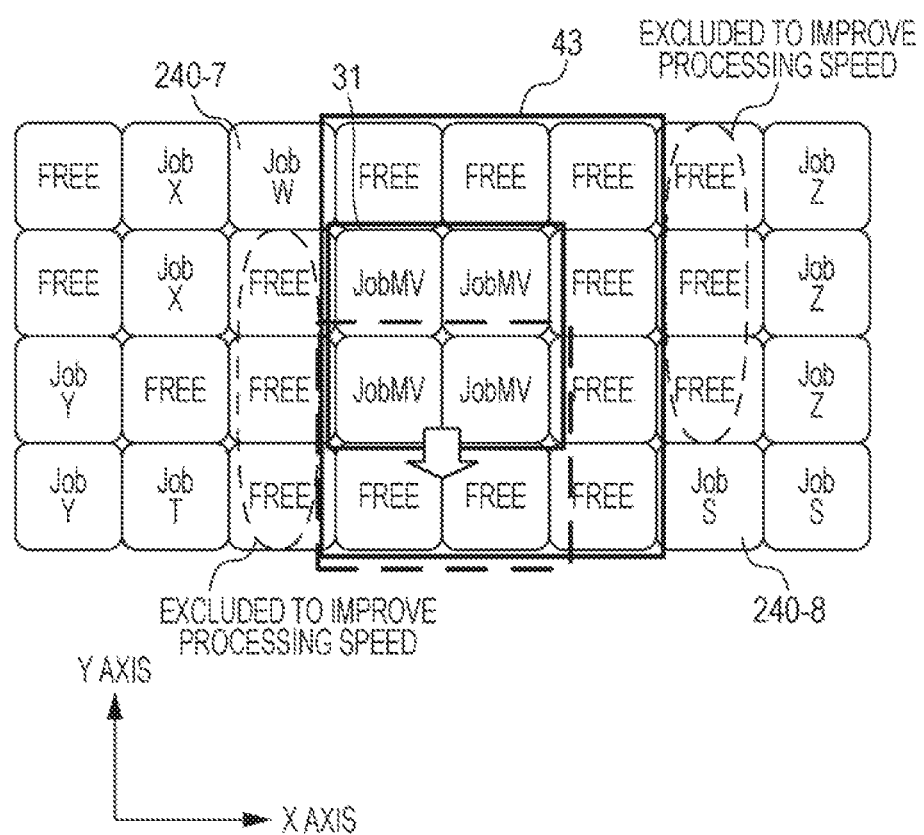
FIG. 10 illustrates an example of a movable area.

The agent 211 determines the movable area of the migration candidate job 31 based on whether or not each computation node in the temporary search frame 32 is a free computation node. FIG. 10 illustrates an example of the movable area. For example, a sub-mesh including a computation node executing the migration candidate job 31 and a free computation node only is determined as the movable area 43. If the network is of a two-dimensional mesh or torus connection, the movable area 43 has a rectangular shape. If the network is of a three-dimensional mesh or torus connection, the movable area 43 has a cuboid shape.

For example, the agent 211 determines that a largest sub-mesh which can be generated in the temporary search frame 32 is the movable area 43. Since the movable area 43 is rectangular or cuboid, complicated computation processing does not have to be performed when the migration candidate job 31 is moved (relocated) or when a new job is submitted, and thereby enables quick processing. That is, a movable area partially having a concave or convex portion complicates the determination procedure for possibility of relocation and submission and thereby impairs real time performance. For example, in the example of FIG. 10, there are free computation nodes in the Y axis direction of the computation node 240-7 executing "JobW" and the computation node 240-8 executing "JobS". However, incorporation of the free computation node into the movable area 43 makes the shape of the movable area complicated, and, as a result, subsequent computation of the job movement (relocation) or the job submittable area takes a time. For solving the problem, in the second embodiment, free computation nodes in the Y axis direction of each of computation nodes 240-7 and 240-8 are excluded from the movable area 43 to shape the movable area 43 into a simple rectangular form (cuboid) and thereby improve the processing speed.

The determined movable area 43 becomes a candidate area into which the migration candidate job 31 is moved. When the migration candidate job 31 is moved into the movable area 43, an area into which a new job can be submitted (job submittable area) is set within a remaining portion of the movable area 43.

Figure 11:
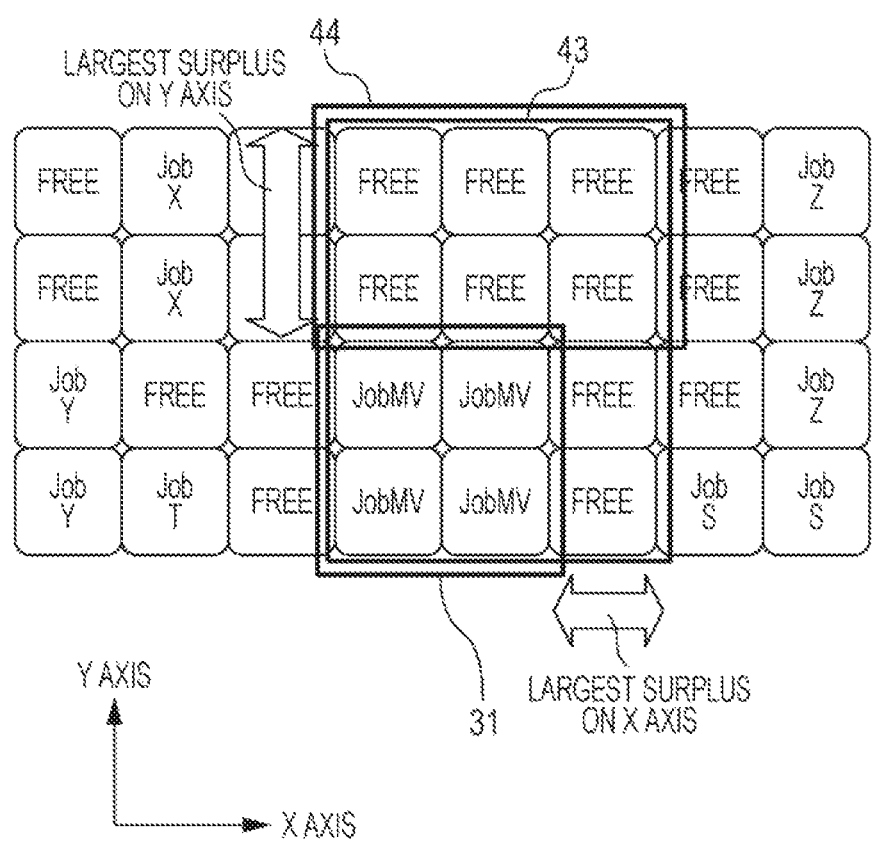
FIG. 11 illustrates an example of a job submittable area after a migration candidate job has been moved.

FIG. 11 illustrates an example of the job submittable area after the migration candidate job has been moved. The example of FIG. 11 illustrates the migration candidate job 31 moved to an end in the negative direction of the X axis and Y axis within the movable area 43. In this case, the job submittable area 44 including six computation nodes can be set within the movable area 43. The job submittable area 44 is a rectangular or cuboid area.

Hereinafter, description is continued by referring back to FIG. 5. The agent 211, which has acquired the movable area, stores information of the movable area into the memory and compares processing performances before and after the migration candidate job has been moved within the movable area (Step S104). For example, the agent 211 measures performance (for example, throughput) of the migration candidate job before moved, and measures performance (for example, throughput) by causing a computation node of the migration destination to execute the migration candidate job. If a clear drop of the processing performance is observed after being moved, the agent 211 changes the migration destination to an alternative location. For example, when the ratio of the processing performance after movement relative to the processing performance before movement is equal to or lower than a predetermined value (for example, equal to or lower than ½), the agent 211 determines that there is a clear drop of the processing performance. When there is a clear drop of the processing performance, the agent 211 returns the migration candidate job to the migration source and searches for another migration destination not causing a drop of the processing performance.

There are various methods for measuring the processing performance, such as, for example, a method of comparing time taken per one loop of the main loop. Alternatively, there is a method of running a test program for testing IO and network communication.

When a migration destination not causing a drop of the performance is found through comparison of processing performances, the agent 211 notifies information indicating the found migration destination of the migration candidate job 31 and job submittable area 44 to the job manager 110. The job manager 110 stores information indicating the migration destination of the notified migration candidate job 31 and the job submittable area 44 into the memory.

Next, the job manager 110 selects a job for newly execution by the computation node (Step S105). For example, the job manager 110 selects a job for execution out of jobs registered in the job manager 110 as in the wait state. For example, a job for execution may be decided as below.

The job manager 110 extracts, as a candidate of the job for execution, a job having the parallelism (the number of used computation nodes) less than the number of computation nodes within the job submittable area 44. When there are two or more submission candidate jobs, the job manager 110 then selects as follow.

To enhance the throughput, the job manager 110 selects a job which ends within a remaining portion of the predetermined time of the migration candidate job 31, preferentially out of submission candidate jobs. If there is no corresponding job, the job manager 110 selects a job having a short predetermined time by considering that the job is released as early as possible. The job selection processing is detailed below.

[Procedure 1] Maximum number of submittable nodes for primary determination is calculated from the number of computation nodes within the movable area 43. Maximum number of job submittable nodes for primary determination is a maximum number of used computation nodes for submittable jobs. Computation method is expressed with the following formula: Maximum number of job submittable nodes=number of computation nodes within movable area−number of computation nodes allocated to migration candidate job [Procedure 2] Primary determination of the submitted job is determined. If the following primary determination reference value is satisfied, the processing proceeds to a next step, and if not satisfied, processing is terminated. Primary determination reference value=maximum number of job submittable nodes for primary determination−number of computation nodes used for execution of submitted jobs>0 If the primary determination reference value is larger than 0, the condition is satisfied. If the primary determination reference value is equal to or smaller than 0, the condition is not satisfied.

[Procedure 3] The job manager 110 measures a maximum shape of the submitted job. Specifically, the measurement is performed in accordance with the following procedure. [Procedure 3-1] The job manager 110 determines the location of the migration candidate job 31 when moved by shifting in the negative direction (toward a smallest number) of X, Y and Z axes within the movable area 43. At this stage, the job is not actually moved (relocated). The job manager 110 generates a sub-mesh (rectangular or cuboid) area within a surplus portion (range where free computation nodes are continuous) in the movable area 43 excluding computation nodes allocated to the moved migration candidate job 31. The job manager 110 recognizes the generated area as the job submittable area 44. In the example of FIG. 11, the job submittable area 44 including six computation nodes is generated.

[Procedure 3-2] The job manager 110 determines whether a selected job can be submitted into the job submittable area 44. For example, if the number of computation nodes in the job submittable area 44 is equal to or larger than the number of computation nodes used for execution of the selected job, the job manager 110 determines that the job can be submitted.

If determined that the job can be submitted, the job manager 110 instructs the agent 211 to move (relocate) the job (Step S106). In response to the instruction of the job manager 110, the agent 211 moves the migration candidate job 31 by migration (Step S107). For example, the agent 211 moves the migration candidate job 31 to an end (smallest number) in the negative direction of X, Y and Z axes in the movable area 43. Specifically, the agent 211 instructs computation nodes currently executing the migration candidate job 31 to move the migration candidate job 31 to a computation node of the migration destination by job migration. Then, instructed computation nodes execute job migration.

Next, the agent 211 compares performances of the migration candidate job 31 before and after the movement by using measured values. For example, the agent 211 measures, in advance, performance (throughput) of the migration candidate job 31 in the computation node before moved. After moving the migration candidate job 31, the agent 211 measures the processing performance in the computation node executing the migration candidate job 31 just for a unit time (for example, about 5 minutes). The agent 211 determines that the processing performance after the migration does not drop by a predetermined value or more than before the migration. For example, when the value obtained by dividing performance after the migration by performance before the migration is equal to or smaller than a predetermined value, the agent 211 determines that there is no drop of the performance. If there is a drop of the performance, the agent 211 cancels the migration (Step S109). For example, the agent 211 returns the migration candidate job 31 to the job location position before migration, again by migration. Then, the process ends.

When there is no drop of the performance of the moved job (that is, when the performance is maintained or improved), the agent 211 submits a new job (Step S110). For example, the agent 211 acquires information of the job selected in the step S105 from the job manager 110 and causes computation nodes in the job submittable area 44 to execute the job.

Thus, fragmentation of free computation nodes may be fixed locally. As a result, a job in the execution queue may be executed earlier and thereby operation efficiency of the system may be improved. Furthermore, since fragmentation is fixed locally, processing may be completed in a short time. Also, processing time may be further reduced since processing such as identification of the free area is executed by a plurality of agents or daemons in a distributed manner.

In response to the free area search instruction sent by the job manager 110 to a plurality of agents (Step S101 of FIG. 5), two or more agents may select the same job as the migration candidate job. Also, at least a portion of the movable area determined respectively by two or more agents may overlap. Then, before sending the job relocation instruction (Step S106), the job manager 110 performs arbitration processing for an overlap of the migration candidate job or the movable area.

Figure 12:
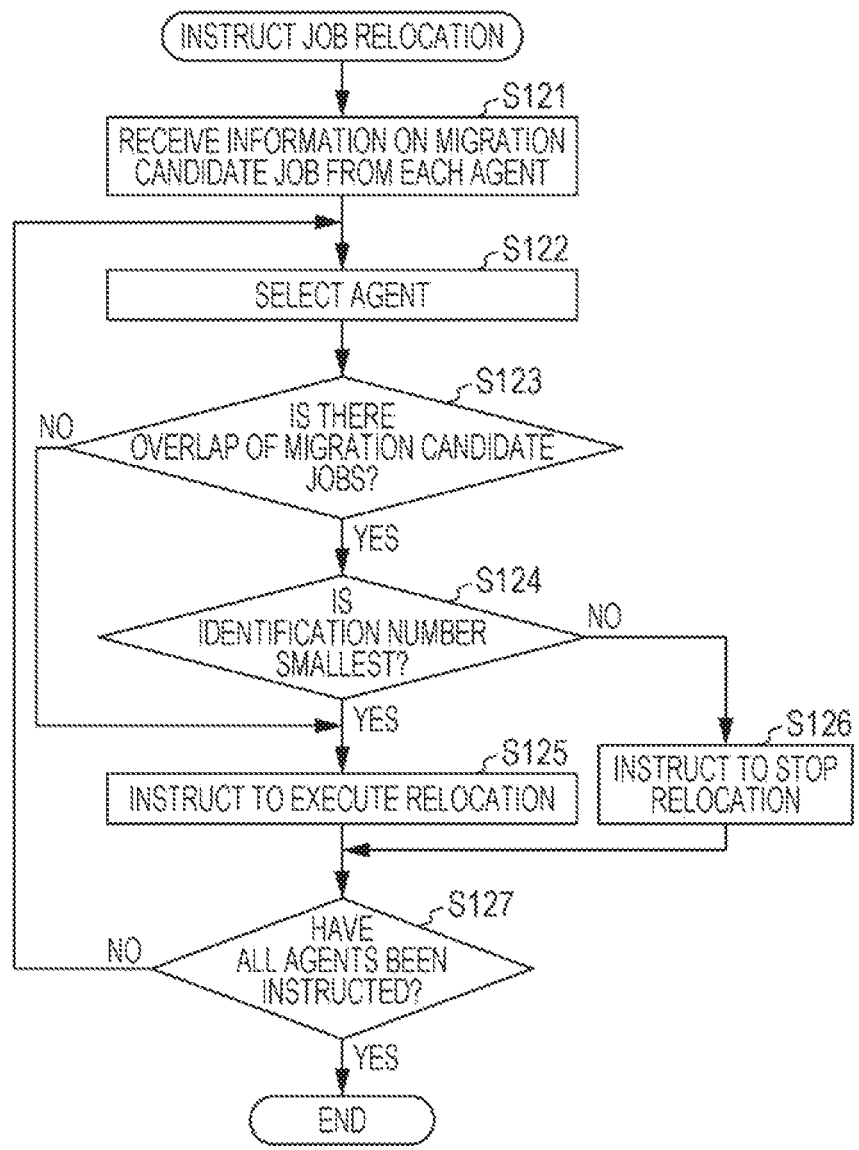
FIG. 12 illustrates an example of a job relocation instruction processing procedure.

FIG. 12 illustrates an example of the job relocation instruction processing procedure. [Step S121] The job manager 110 receives information indicating the migration candidate job and the movable area from respective agents. For example, the job manager 110 receives information indicating the job ID of the migration candidate job 31 and the range of the movable area 43 from respective agents.

[Step S122] The job manager 110 selects one unselected agent from a plurality of agents. [Step S123] The job manager 110 determines whether the migration candidate job or the movable area identified by the selected agent overlaps a migration candidate job or a movable area identified by the other agent. For example, when a job ID of the migration candidate job acquired from a selected agent matches at least one job ID of a migration candidate job acquired from the other agent, the job manager 110 determines that the migration candidate jobs overlap each other. Further, when the range of the movable area acquired from a selected agent matches at least one range of a movable area acquired from the other agent, the job manager 110 determines that the movable areas overlap each other. If there is an overlap, the processing proceeds to the step S124. If there is no overlap, the processing proceeds to the step S125.

[Step S124] The job manager 110 determines whether the ID of the selected agent is smallest among agents which identify the same job as the migration candidate job. If smallest, the processing proceeds to the step S125. If not smallest, the processing proceeds to the step S126.

[Step S125] The job manager 110 instructs the selected agent to execute relocation of the migration candidate job. Then, the processing proceeds to the step S127.

[Step S126] The job manager 110 instructs the selected agent to stop relocation. [Step S127] The job manager 110 determines whether all agents have been instructed. If there is an agent not yet instructed, the processing proceeds to the step S122. If all agents have been instructed, the job relocation instruction processing ends.

Thus, even when a plurality of agents are caused to execute a processing in parallel, relocation may be instructed without causing inconsistency. As a result, reliability of a processing using a plurality of agents may be improved.

Although in the second embodiment, a job to be submitted is selected after the movable area 43 is determined, the job to be submitted may be determined first, and then the movable area 43 where the job is executable may be found out. For example, the job manager 110 selects one movable area 43 where a job to be submitted is executable, out of movable areas 43 acquired from agents 211, 221, 231. Then, the job manager 110 instructs the agent which has notified the selected movable area 43 to submit the job.

Next, the third embodiment is described. In the third embodiment, when a new job is not submitted, job migration is performed based on the estimated finish time of respective jobs. For example, in the light of the finish time of a job being executed by computation nodes around the computation node executing the migration candidate job, job migration of the migration candidate job is performed such that the job adjoins a job having a longest estimated finish time. By selecting a computation node around a computation node executing a job having a short finish time as a free computation node, the range of free computation nodes increases when the job having a short finish time ends. As a result, when a next job is added, a wider area is available as a job submittable area.

FIG. 13 illustrates an example of a job migration according to the third embodiment. In the example of FIG. 13, there is a migration candidate job 51 with the estimated finish time of two hours within the movable area 52. In computation nodes around the movable area 52, jobs including "JOB A" to "JOB G" are being executed. Among jobs being executed in computation nodes around the movable area 52, "JOB E" has a longest estimated finish time. Therefore, the migration candidate job 51 is moved by job migration to a location adjoining an area 53 occupied by a computation node executing the JOB E.

Figure 14A:
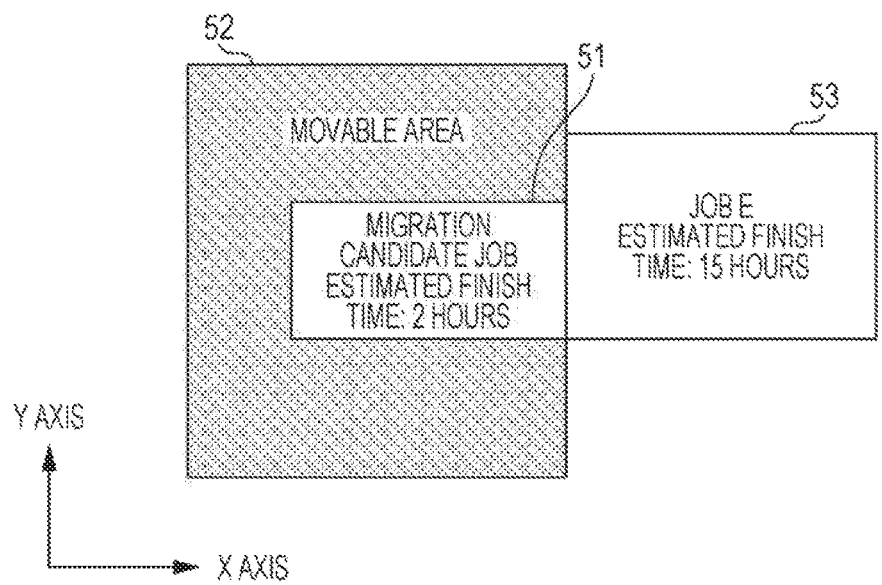
FIGS. 14A and 14B illustrate examples of a migration destination based on the location of a job having a longest estimated finish time.
Figure 14B:
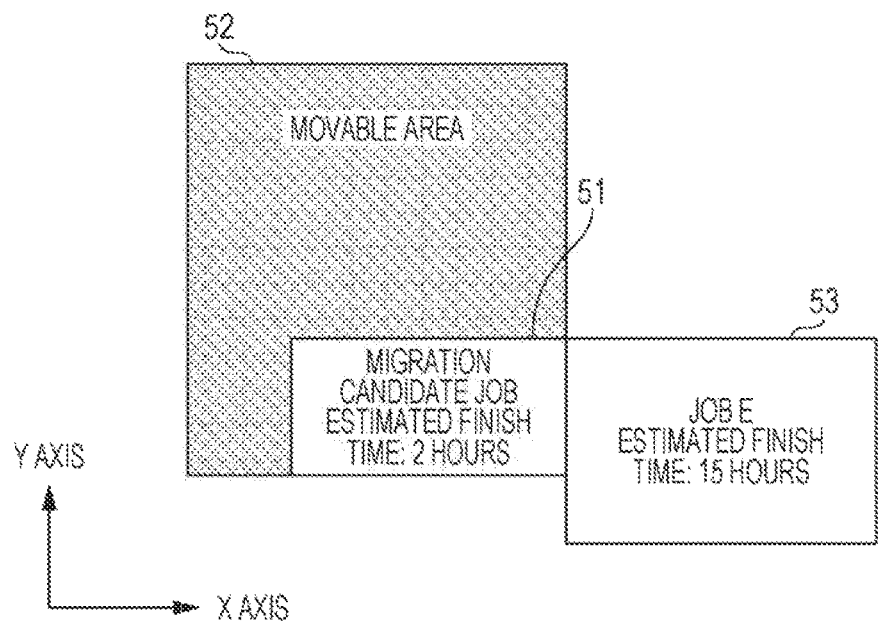

FIGS. 14A and 14B illustrate examples of the migration destination based on the location of the job having a longest estimated finish time. FIG. 14A illustrates a case where one side of the area 53 occupied by the computation node executing a job having a longest estimated finish time is entirely in contact with one side of the movable area 52. In the example of FIG. 14A, the area 53 and the movable area 52 are in contact are with each other on each side thereof parallel to the Y axis. In this case, the migration candidate job 51 is moved such that a bottom side in the Y axis direction of the area 53 (smallest value of Y axis) and a bottom side in the Y axis direction of the area occupied by a computation node at the migration destination of the migration candidate job 51 match each other.

FIG. 14B illustrates a case where one side of the area 53 occupied by the computation node executing a job having a longest estimated finish time is partly in contact with one side of the movable area 52. In the example of FIG. 14B, a bottom side in the Y axis direction of the area 53 is lower than a bottom side in the Y axis direction of the movable area 52. In this case, the migration candidate job 51 is moved such that a bottom side in the Y axis range of the movable area 52 and a bottom side of the area occupied by a computation node at the migration destination of the migration candidate job 51 match each other.

Figure 15:
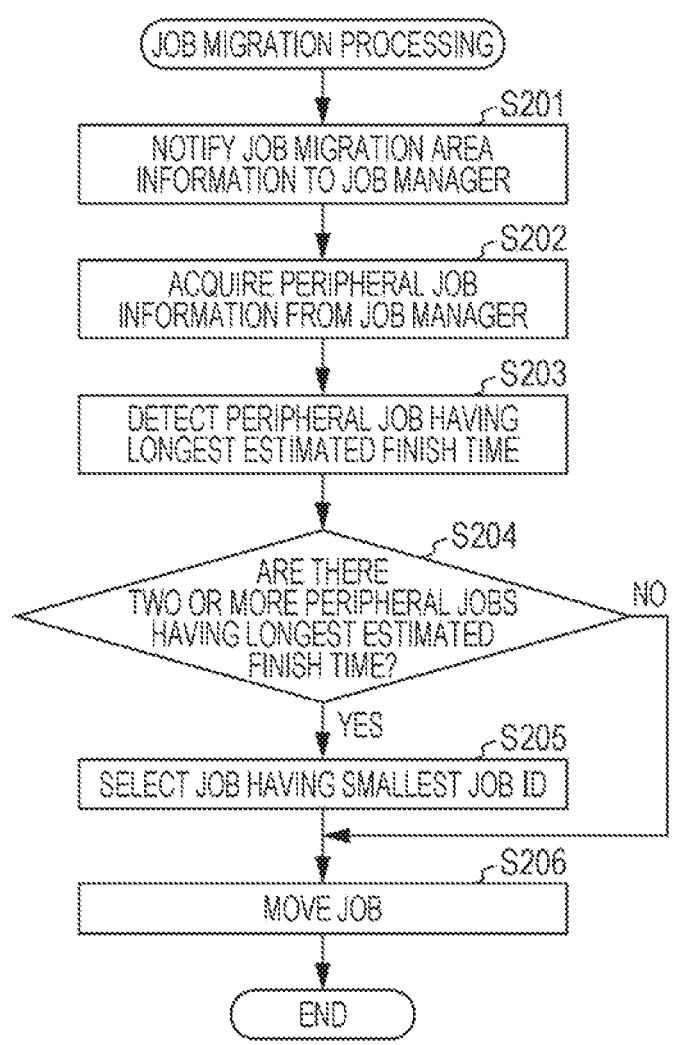
FIG. 15 illustrates an example of a job migration processing procedure according to the third embodiment.

FIG. 15 illustrates an example of a job migration processing procedure according to a third embodiment. [Step S201] The agent 211 notifies information indicating the movable area 52 to the job manager 110.

[Step S202] Peripheral job information is acquired from the job manager 110. The peripheral job information indicates. For example, an estimated finish time (how long it takes to finish) of a job being executed by a computation node at a location adjoining the movable area 52.

FIG. 16 illustrates an example of the peripheral job information. For example, peripheral job information 54 of the structure illustrated in FIG. 16 is notified from the job manager 110 to the agent 211 in the state of the linked list. The peripheral job information 54 includes links to the following peripheral job information as well as the area including a computation node allocated to the job ID, the job name and the job. The agent 211 recognizes allocation state of computation nodes around the movable area 52 to the job by tracing a link to the peripheral job information 54. The agent 211 designates jobs recognized from the peripheral job information 54 and acquires the estimated finish time of the jobs from the job manager 110. Thus, the agent 211 recognizes the estimated finish time of peripheral jobs.

Hereinafter, description is continued by referring back to FIG. 15. [Step S203] The agent 211 detects a job having a longest estimated finish time among peripheral jobs.

[Step S204] The agent 211 determines whether there are two or more jobs having a longest estimated finish time. If there are two or more relevant jobs, the processing proceeds to the step S205. If only one job is applicable, the job is selected and the processing proceeds to the step S206.

[Step S205] The agent 211 selects a job having a smallest job ID among jobs having the longest estimated finish time. [Step S206] The agent 211 moves by job migration the migration candidate job to a computation node adjoining a computation node executing the selected job.

As described above, even in a case other when a new job is submitted, a large job submission area may be prepared before next job submitted by locally fixing fragmentation of the free computation node. As a result, operation efficiency of the system may be improved.

Next, the fourth embodiment is described. In the fourth embodiment, even when a new job is submitted, the migration candidate job is moved to an appropriate location based on an estimated finish time of peripheral jobs around the movable area. For example, in the fourth embodiment, the location to which the migration candidate job is moved is determined based on an estimated finish time of a new job and an estimated finish time of the migration candidate job.

FIG. 17 illustrates patterns of the comparison result between estimated finish times of the new job and the migration candidate job. "Pattern 1" represents a case where the estimated finish time of the new job is longer than the estimated finish time of the migration candidate job. In this case, migration destination of the migration candidate job is selected by "selection action I". "Pattern 2" represents a case where the estimated finish time of the new job is shorter than the estimated finish time of the migration candidate job. In this case, migration destination of the migration candidate job is selected by "selection action II". "Pattern 3" represents a case where the estimated finish time of the new job is the same as the estimated finish time of the migration candidate job. For example, if a difference between the estimated finish time of the new job and the estimated finish time of the migration candidate job is equal to or smaller than a predetermined value, both of the estimated finish times are considered the same. In this case, migration destination of the migration candidate job is selected by "selection action I".

"Selection action I" first determines the job submittable area and then determines the migration destination of the migration candidate job. "Selection action II" first moves the migration candidate job and then determines the job submittable area.

Figure 18:
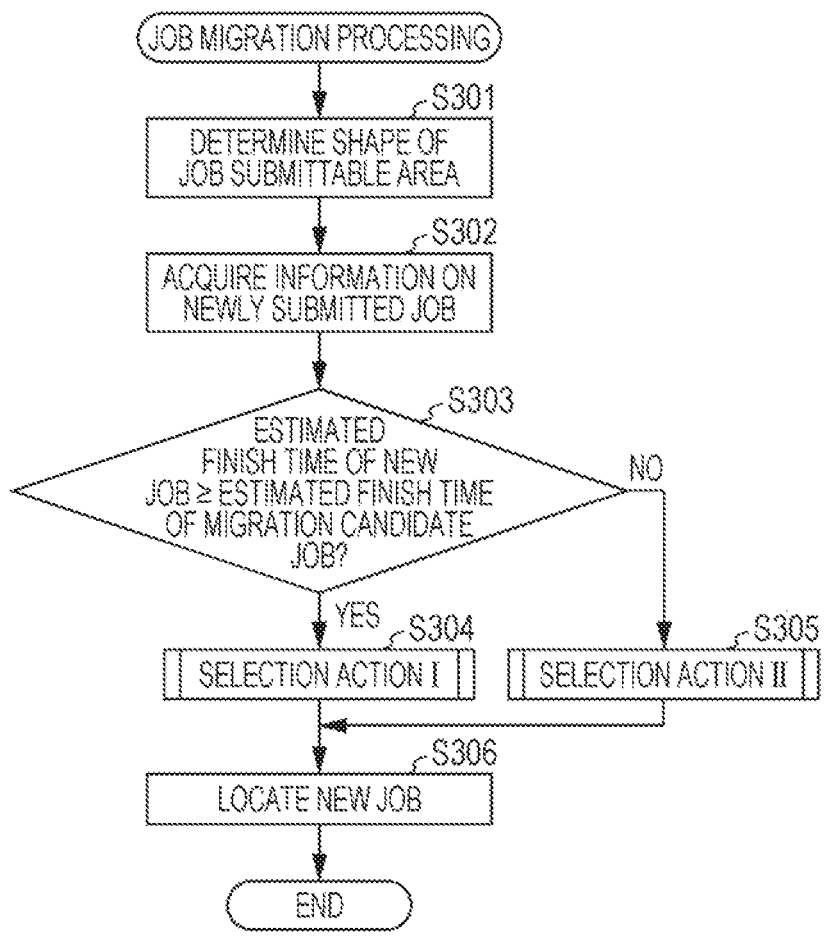
FIG. 18 illustrates an example of a job migration processing according to a fourth embodiment.

FIG. 18 illustrates an example of a job migration processing according to a fourth embodiment. [Step S301] The agent 211 determines the shape of the job submittable area. For example, the agent 211 determines the shape of a largest rectangular or cuboid area which can be generated in a free area when a migration job is shifted in a predetermined direction (for example, in the negative direction of respective axes) within the movable area, as the shape of the job submittable area.

[Step S302] The agent 211 acquires information of a new job to be submitted into the job submittable area, from the job manager 110. [Step S303] The agent 211 determines whether the estimated finish time of the new job is equal to or longer than the estimated finish time of the migration candidate job. If the estimated finish time of the new job is equal to or longer than the estimated finish time of the migration candidate job, the processing proceeds to the step S304. If the estimated finish time of the new job is shorter than the estimated finish time of the migration candidate job, the processing proceeds to the step S305.

[Step S304] The agent 211 moves the migration candidate job by "selection action I". Migration processing by "selection action I" is described in detail below (see FIG. 21). Then, the processing proceeds to the step S306.

[Step S305] The agent 211 moves the migration candidate job by "selection action II". Migration processing by "selection action II" is described in detail below (see FIG. 22). [Step S306] The agent 211 locates a new job in the job submittable area. That is, the agent 211 causes a computation node within the job submittable area to execute the new job.

Figure 19:
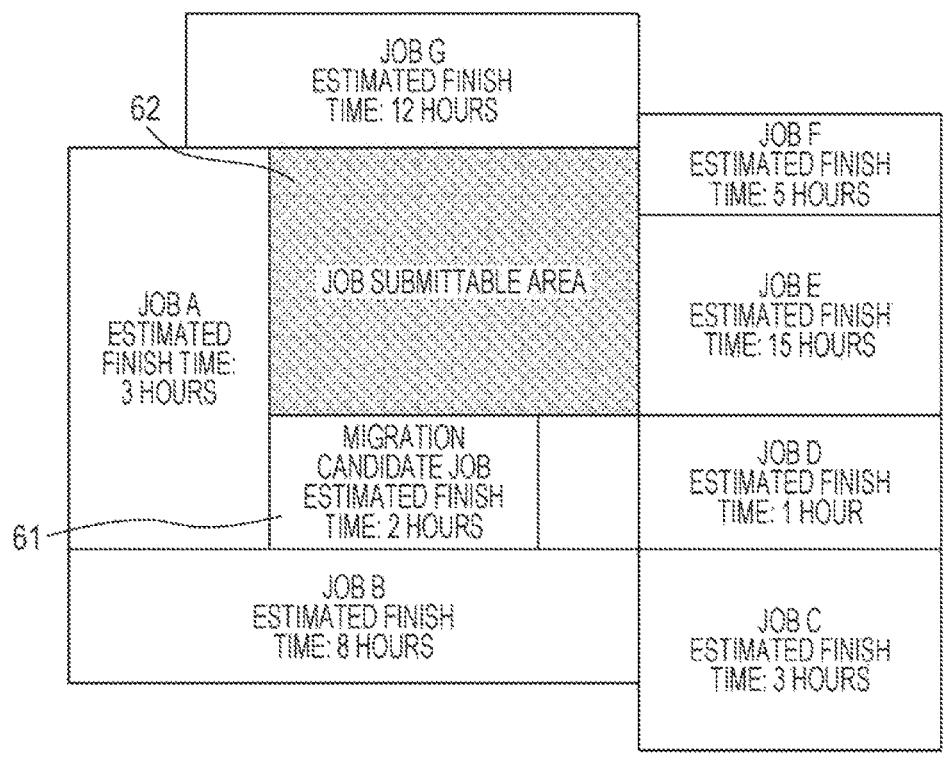
FIG. 19 illustrates an example of a job submittable area according to the fourth embodiment.

FIG. 19 illustrates an example of the job submittable area according to the fourth embodiment. The migration candidate job 61 is moved in the negative direction of respective axes within the movable area. Then, a largest rectangular or cuboid area within an area in the movable area other than the area where the migration candidate job 61 is located becomes the job submittable area 62.

Figure 20A:
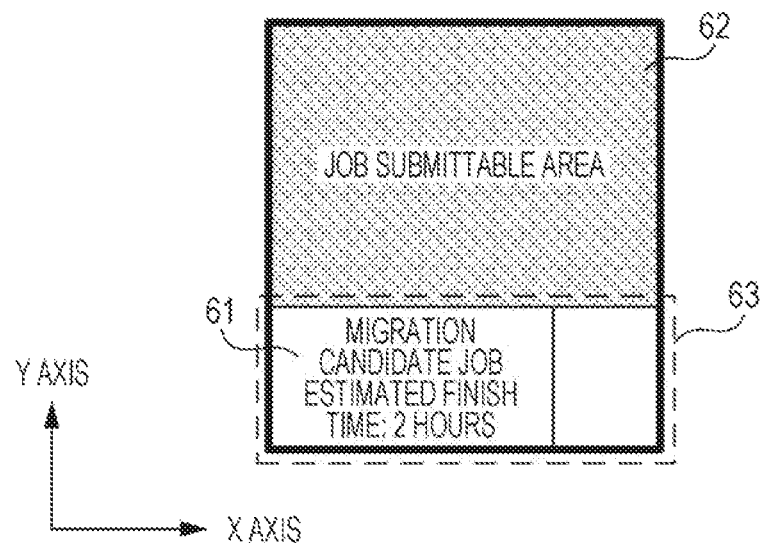
FIGS. 20A and 20B illustrate location examples of the job submittable area.
Figure 20B:
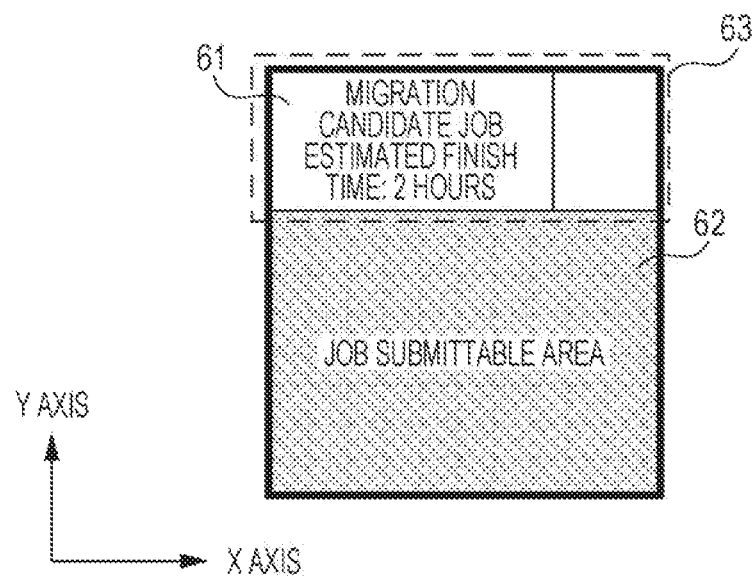

Placement of the job submittable area 62 depends on the relationship with the migration candidate job 61. FIGS. 20A and 20B illustrate placement examples of the job submittable area. FIG. 20A illustrates an example in which the job submittable area 62 is located by shifting in the positive direction of the Y axis. FIG. 20B illustrates an example in which the migration candidate job 61 is located by shifting in the negative direction of the Y axis.

When the job submittable area 62 is determined, an area within the movable area other than the job submittable area 62 becomes a migration job locatable area 63 where the migration candidate job 61 can be located. In the examples of FIGS. 20A and 20B, the migration candidate job 61 is located by shifting in the negative direction of the X axis within the migration job locatable area 63.

Location within the migration job locatable area 63 in which the migration candidate job 61 is located is determined based on the relationship with peripheral jobs. In the fourth embodiment, the migration candidate job 61 is located in a location adjoining a job having a longest estimated finish time (longest-finish time job) among peripheral jobs around the migration job locatable area 63.

Figure 21:
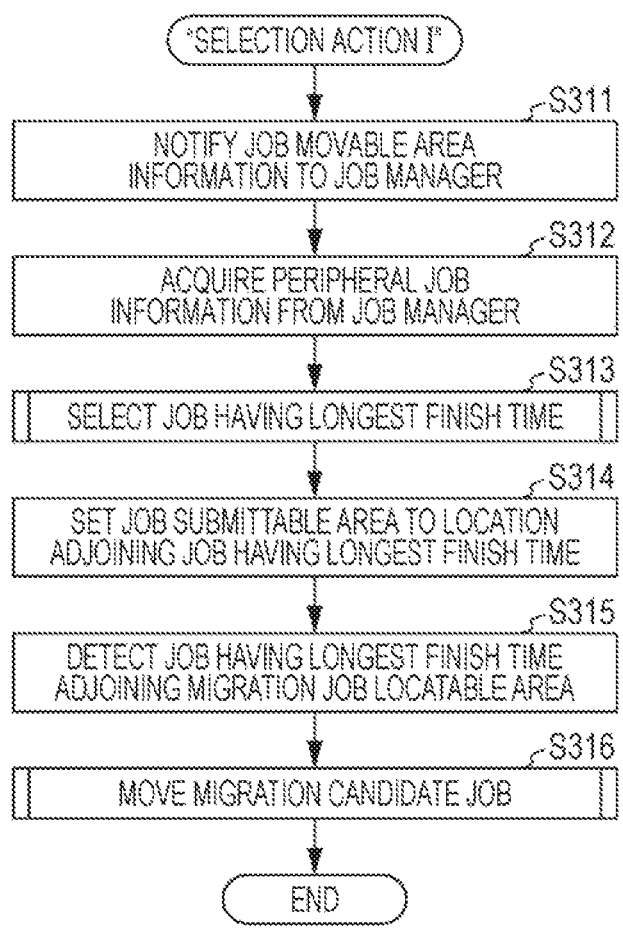
FIG. 21 is a flowchart illustrating an example of a processing procedure of "selection action I"

Next, "selection action I" processing procedure is described. FIG. 21 is a flowchart illustrating an example of a processing procedure of "selection action I". [Step S311] The agent 211 notifies information indicating the movable area 52 to the job manager 110.

[Step S312] Peripheral job information is acquired from the job manager 110. [Step S313] The agent 211 selects the longest-finish time job 64 from peripheral jobs. Detail of the processing is described later (see FIG. 23).

[Step S314] The agent 211 sets the job submittable area 62 at a location adjoining the selected longest-finish time job 64. [Step S315] The agent 211 detects the longest-finish time job 64 adjoining the migration job locatable area 63.

Figure 25:
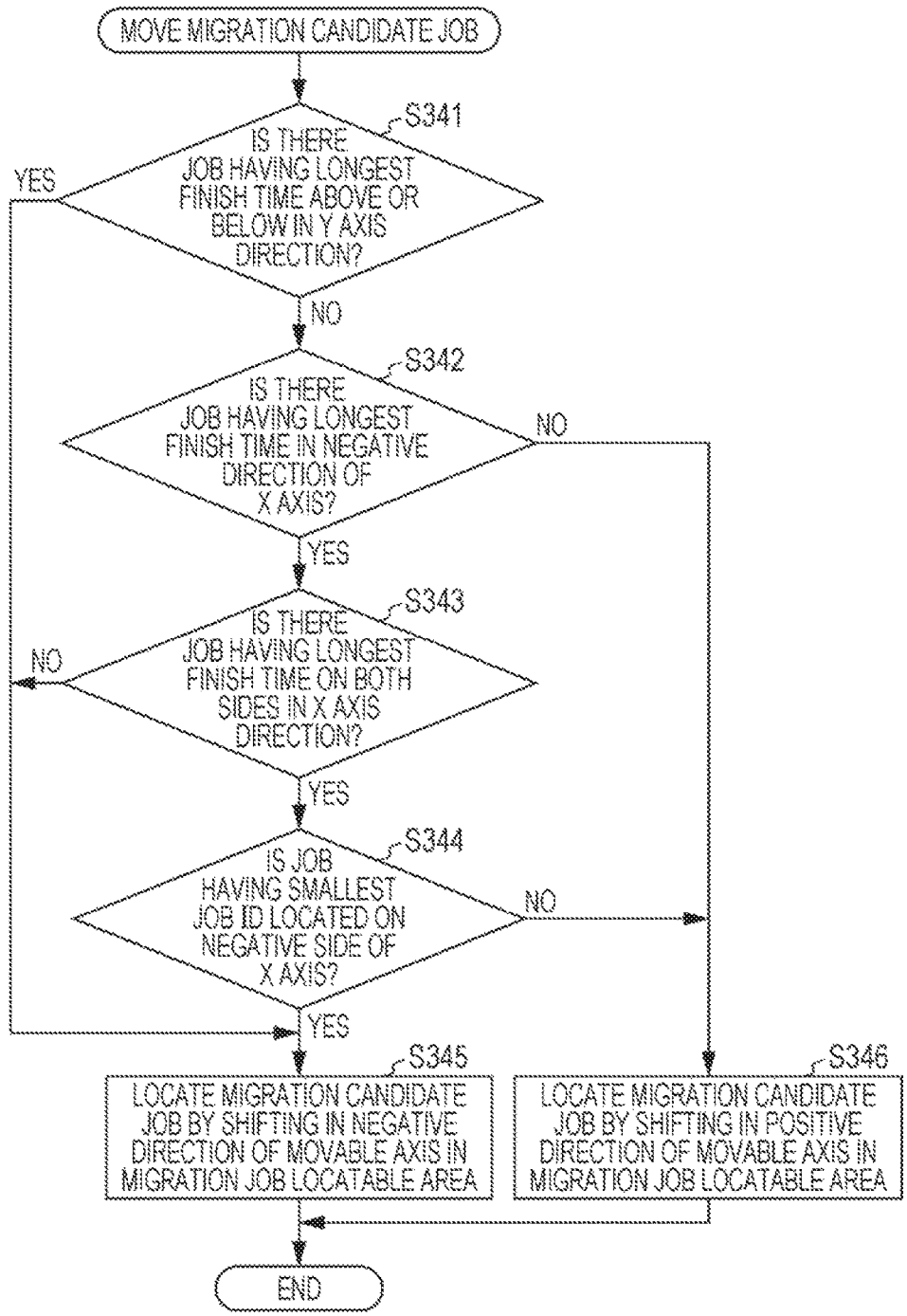
FIG. 25 is a flowchart illustrating an example of a migration candidate job migration processing procedure.

[Step S316] The agent 211 moves the migration candidate job 61. The migration candidate job migration processing is described in detail below (FIG. 25). Next, processing procedure of "selection action II" is described.

Figure 22:
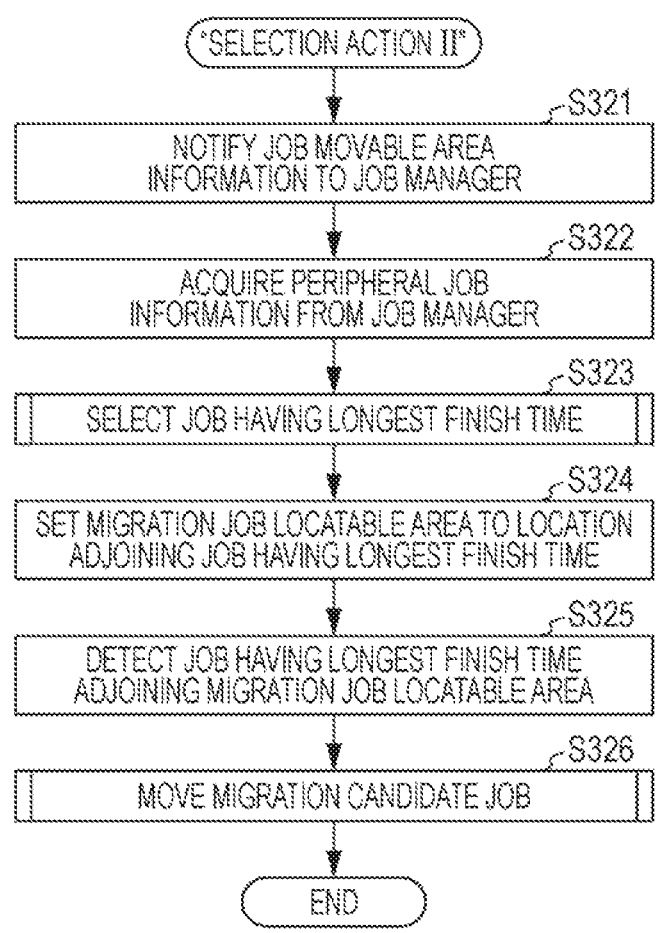
FIG. 22 is a flowchart illustrating an example of a processing procedure of "selection action II"

FIG. 22 is a flowchart illustrating an example of the processing procedure of "selection action II". [Step S321] The agent 211 notifies information indicating the movable area 52 to the job manager 110.

[Step S322] Peripheral job information is acquired from the job manager 110. [Step S323] The agent 211 selects the longest-finish time job 64 from peripheral jobs. Detail of the processing is described later (see FIG. 23).

[Step S324] The agent 211 sets the migration job locatable area 63 at a location adjoining the selected longest-finish time job 64. [Step S325] The agent 211 detects the longest-finish time job 64 adjoining the migration job locatable area 63.

[Step S326] The agent 211 moves the migration candidate job 61. The migration candidate job migration processing is described in detail below (FIG. 25). Next, longest-finish time job selection processing is described in detail.

Figure 23:
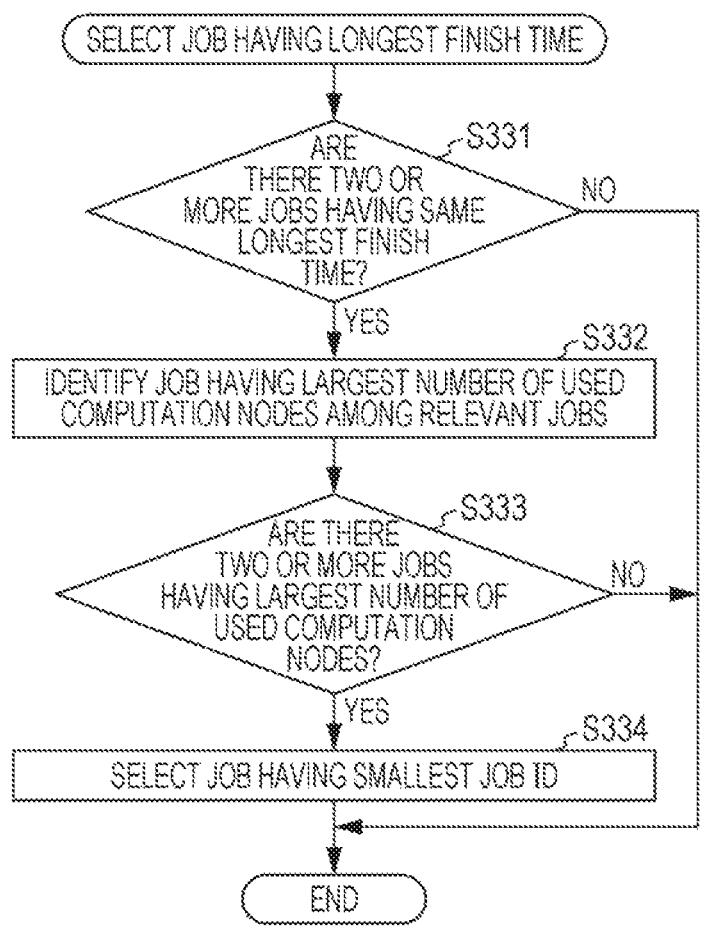
FIG. 23 is a flowchart illustrating an example of a longest-finish time job selection processing procedure.

FIG. 23 is a flowchart illustrating an example of the longest-finish time job selection processing procedure. [Step S331] The agent 211 determines whether there are two or more jobs having a longest-finish time (longest-finish time job) among peripheral jobs in the movable area. If there are two or more longest-finish time jobs, the processing proceeds to the step S332. If only one longest-finish time job is applicable, the job is selected and the longest-finish time job selection processing ends.

[Step S332] The agent 211 identifies a job having maximum number of used computation nodes (parallelism) among longest-finish time jobs. [Step S333] The agent 211 determines whether there are two or more jobs having the maximum number of used computation nodes. If there are two or more jobs, the processing proceeds to the step S334. If only one job is applicable, the job is selected and the longest-finish time job selection processing ends.

[Step S334] The agent 211 selects a job having a smallest job ID among jobs having the maximum number of used computation nodes. Next, submission of the migration candidate job within the migration job submittable area is described.

Figure 24A:
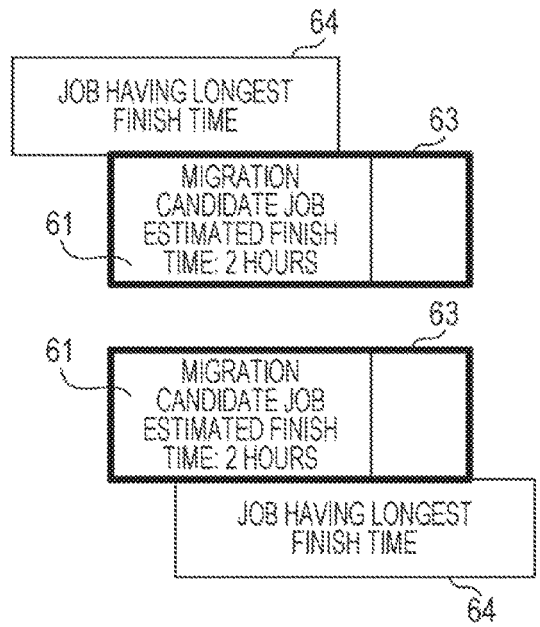
FIGS. 24A, 24B, and 24C illustrate location examples of a migration candidate job in the migration job locatable area.
Figure 24B:
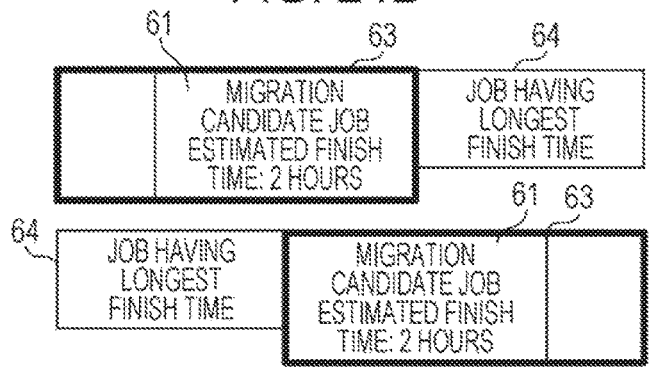
Figure 24C:
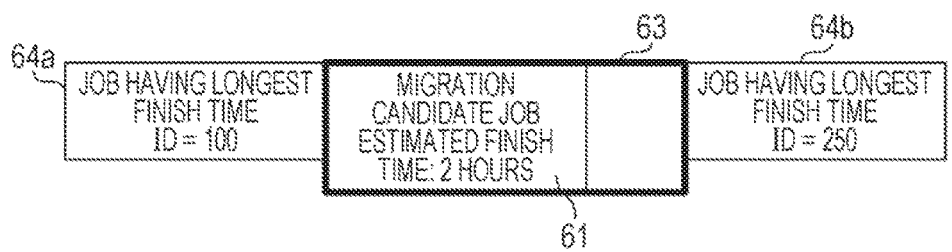

FIGS. 24A, 24B, and 24C illustrate placement examples of the migration candidate job within the migration job submittable area. FIG. 24A is an example in which the migration candidate job is shifted in the negative direction of a movable axis. If any location within the migration job locatable area 63 adjoins the longest-finish time job 64, the migration candidate job 61 is located by shifting in the negative direction of a movable axis (in the example of FIG. 24A, X axis).

FIG. 24B illustrates a case in which the migration candidate job is shifted in a direction of the longest-finish time job. For example, the longest-finish time job 64 may be in contact with one end in an axial direction in which the migration candidate job 61 can be moved within the migration job locatable area 63. In this case, the migration candidate job 61 is located by shifting in a direction in which the longest-finish time job 64 exists.

FIG. 24C illustrates a case in which the migration candidate job is shifted in a direction in which there is a longest-finish time job having a smallest ID. There may exist two longest-finish time jobs 64a, 64b. In this case, job IDs of longest-finish time jobs 64a, 64b are compared, and a longest-finish time job 64a having a smaller job ID is identified. Then, the migration candidate job 61 is located by shifting in a direction in which the identified longest-finish time job 64a exists.

In response to such a placement, the migration candidate job is moved in accordance with the following procedure. FIG. 25 is a flowchart illustrating an example of the migration candidate job migration processing procedure. [Step S341] The agent 211 determines whether there is a longest-finish time job above or below the migration job submittable area in the Y axis direction. If there is a longest-finish time job above or below in the Y axis direction, the processing proceeds to the step S345. If there is not a longest-finish time job above or below in the Y axis direction, the processing proceeds to the step S342.

[Step S342] The agent 211 determines whether there is a longest-finish time job in the negative direction of the X axis with respect to the migration job submittable area. If there is a longest-finish time job on the left side of the X axis direction, the processing proceeds to the step S343. If there is not a longest-finish time job on the left side of the X axis direction, processing proceeds to the step S346.

[Step S343] The agent 211 determines whether there is a longest-finish time job on both sides in the X axis direction with respect to the migration job submittable area. If there is a longest-finish time job on both sides in the X axis direction, the processing proceeds to the step S344. If there is a longest-finish time job on only one side in the X axis direction, the processing proceeds to the step S345.

[Step S344] The agent 211 determines whether the longest-finish time job having the smallest job ID among longest-finish time jobs on both sides in the X axis direction is in the negative direction of the X axis. If in the negative direction of the X axis, the processing proceeds to the step S345. If in the positive direction of the X axis, the processing proceeds to the step S346.

[Step S345] The agent 211 locates the migration candidate job by shifting in the negative direction of the movable axis in the migration job submittable area. Then, the migration candidate job migration processing ends.

[Step S346] The agent 211 locates the migration candidate job by shifting in the positive direction of the movable axis in the migration job submittable area. Then, the migration candidate job migration processing ends.

Thus, when the estimated finish time of a new job is equal to or longer than the estimated finish time of the migration candidate job, the new job is located at a location adjoining the longest-finish time job by "selection action I". Then the estimated finish time of a new job is shorter than the estimated finish time of the migration candidate job, the new job is located at a location adjoining the longest-finish time job by "selection action II". Thus, jobs having long estimated finish times may be located at locations adjoining each other, and thereby occurrence of job fragmentation may be suppressed.

Furthermore, since the migration candidate job is located by shifting within the migration job submittable area so as to adjoin a longest-finish time job, a free area within the migration job submittable area in which the longest-finish time job is not located adjoins a job having a relatively short estimated finish time. As a result, when the job having a short estimated finish time ends, a well-arranged large free area may be secured.

Although embodiments of the present disclosure are illustrated as above, configuration of elements illustrated in the embodiments may be replaced with those having similar functions. Furthermore, any other structures and processes may be added thereto. Furthermore, any two or more configurations (features) out of the embodiments described above may be combined. All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel computing system, comprising:
 a plurality of computation nodes connected in a mesh or torus connection and configured to perform parallel computation; and
 a job management node including a computer, being coupled to the plurality of computation nodes, and being configured to:
  manage a plurality of jobs, the plurality of jobs including currently executing jobs and queued jobs,
  select a first job, from among the currently executing jobs, the first job being executed by one or more first computation nodes, among the plurality of computation nodes, a first area being occupied by the one or more first computation nodes, search for a second area adjoining the first area, the second area being occupied by one or more free computation nodes, among the plurality of computation nodes, the one or more free computation nodes not currently executing any job, determine a fourth area of a same size as the first area at a location contacting an edge of a periphery of a third area comprising the first area and the second area, the fourth area being determined based on a translational shifting of the first area in one or more axial directions from a first computation node, among the one or more first computation nodes, so as to form an area of remaining contiguous free computational nodes in the third area, the edge of the periphery of the third area being determined by determining an area of rectangular form in the third area, the rectangular form being formed by excluding certain nodes in concave or convex portions of the third area, determine a fifth area of a predetermined shape from the remaining contiguous free computational nodes in the third area so as to not overlap the fourth area in the third area, determine whether a second job, from among the queued jobs, is executable by one or more third computation nodes included in the fifth area, and when the second job is determined to be executable by the one or more third computation nodes, instruct the one or more first computation nodes to migrate the first job to one or more second computation nodes in the fourth area, and instruct the one or more third computation nodes to execute the second job.

2. The parallel computing system according to claim 1, wherein in the search, the job management node instructs one of the one or more first computation nodes to search for the second area, the one of the one or more first computation nodes transmits first data for search for the one or more free computation nodes to an adjoining node, upon receiving the first data, a free computation node, among the one or more free computation nodes counts up a value of a first counter within the first data and transfers the first data to a computation node adjoining on the side opposite to the one of the one or more first computation nodes, upon receiving the first data, a node in use for executing any job among the plurality of computation nodes sends the first data back to the one of the one or more first computation nodes, and the one of the one or more first computation nodes identifies a range of the second area based on the value of the first counter within the returned first data and transmits the identified range of the second area to the job management node.

3. The parallel computing system according to claim 2, wherein when the first data is returned, the one of the one or more first computation nodes transmits second data for search for a free node in a different direction to a relaying free computation node on a transfer path of the first data, upon receiving the second data, the relaying free computation node transfers the second data to adjoining computation nodes in a direction other than a direction toward the one of the one or more first computation nodes and a direction opposite thereto, upon receiving the second data, the free computation node counts up a value of a second counter within the second data and transfers the second data to a computation node adjoining on a side opposite to the direction toward the relaying free computation node, upon receiving the second data, the node in use returns the second data to the one of the one or more first computation nodes, and the one of the one or more first computation nodes identifies the range of the second area based on values of the first counter and the second counter within the returned first data and the second data, and transmits information indicating an identified range of the second area to the job management node.

4. The parallel computing system according to claim 1, wherein when determining the fourth area, the job management node determines the fourth area based on an estimated finish time indicating a time taken to finish a processing for each of peripheral jobs being executed in computation nodes adjoining the third area.

5. The parallel computing system according to claim 1, wherein when determining the fourth area and the fifth area, the job management node compares an estimated finish time of the first job and an estimated finish time of the second job, and then determines the fourth area and the fifth area based on a result of the comparison and the estimated finish time of each of the peripheral jobs.

6. The parallel computing system according to claim 1, wherein when instructing the migration, the job management node compares performances of the one or more first computation nodes and performances of the one or more second computation nodes, and instructs the migration only when the performances of the one or more second computation nodes is equal to or higher than a value obtained by multiplying the performances of the one or more first computation nodes by a predetermined value.

7. A job management device used as one node within a parallel computing system including a plurality of computation nodes, the job management device comprising:

a communication interface configured to communicate with the plurality of computation nodes which are connected in a mesh or torus connection;

a memory; and a processor coupled to the memory and the communication interface, the processor being configured to:

instruct job migration to the plurality of computation nodes for a plurality of jobs via the communication interface, the plurality of jobs including currently executing jobs and queued jobs, select a first job, from among the currently executing jobs, the first job being executed by one or more first computation nodes, among the plurality of computation nodes, a first area being occupied by the one or more first computation nodes, search for a second area adjoining the first area, the second area being occupied by one or more free computation nodes, among the plurality of computation nodes, the one or more free computation nodes not currently executing any job, determine a fourth area of the same size as the first area at a location contacting an edge of a periphery of a third area comprising the first area and the second area, the fourth area being determined based on a translational shifting of the first area in one or more axial directions from a first computation node, among the one or more first computation nodes, so as to form an area of remaining contiguous free computational nodes in the third area, the edge of the periphery of the third area being determined by determining an area of rectangular form in the third area, the rectangular form being formed by excluding certain nodes in concave or convex portions of the third area, determine a fifth area of a predetermined shape from the remaining contiguous free computational nodes in the third area so as to not overlap the fourth area in the third area, determine whether a second job, from among the queued jobs, is executable by one or more third computation nodes included in the fifth area, and when the second job is determined to be executable by the one or more third computation nodes, instruct the one or more first computation nodes to migrate the first job to one or more second computation nodes in the fourth area via the communication interface, and instruct the one or more third computation nodes to execute the second job via the communication interface.

8. A job management method for a computer used as one node in a parallel computing system, the parallel computing system including a plurality of computation nodes which are connected in a mesh or torus connection, the node managing a plurality of jobs, the plurality of jobs including currently executing jobs and queued jobs, the method comprising:

selecting a first job, from among the currently executing jobs, the first job being executed by one or more first computation nodes, among the plurality of computation nodes, a first area being occupied by the one or more first computation nodes;

searching for a second area adjoining the first area, the second area being occupied by one or more free computation nodes, among the plurality of computation nodes, the one or more free computation nodes not currently executing any job;

determining a fourth area of the same size as the first area at a location contacting an edge of a periphery of a third area comprising the first area and the second area, the fourth area being determined based on a translational shifting of the first area in one or more axial directions from a first computation node, among the one or more first computation nodes, so as to form an area of remaining contiguous free computational nodes in the third area, the edge of the periphery of the third area being determined by determining an area of rectangular form in the third area, the rectangular form being formed by excluding certain nodes in concave or convex portions of the third area;

determining a fifth area of a predetermined shape from the remaining contiguous free computational nodes in the third area so as to not overlap the fourth area in the third area;

determining whether a newly submitted second job, from among the queued jobs, is executable by one or more third computation nodes included in the fifth area; and when the second job is determined to be executable by the one or more third computation nodes, instructing the one or more first computation nodes to migrate the first job to one or more second computation nodes within the fourth area, and instructing the one or more third computation nodes to execute the second job.

* * * * *